US012780412B2

(12) United States Patent
Cleveland Cox, IV et al.

(10) Patent No.: US 12,780,412 B2
(45) Date of Patent: Nov. 3, 2026

(54) AERIAL EMERGENCY LOAD RELEASE MECHANISM SYSTEM AND METHOD FOR AN AERIAL TRANSPORT SYSTEM

(71) Applicant: Aerial Solutions, Inc., Tabor City, NC (US)

(72) Inventors: William Cleveland Cox, IV, Tabor City, NC (US); Ashley Lewis Bellamy, Tabor City, NC (US); Nickolas Kevin Heniford, Loris, SC (US)

(73) Assignee: Aerial Solutions, Inc., Tabor City, NC (US)

( * ) Notice: Subject to any disclaimer, the term of this patent is extended or adjusted under 35 U.S.C. 154(b) by 33 days.

(21) Appl. No.: 19/014,505

(22) Filed: Jan. 9, 2025

(65) Prior Publication Data

US 2025/0223038 A1 Jul. 10, 2025

Related U.S. Application Data

(60) Provisional application No. 63/619,544, filed on Jan. 10, 2024.

(51) Int. Cl.

*B64D 1/12* (2006.01)
*A01G 23/095* (2006.01)
*B64C 27/06* (2006.01)

(52) U.S. Cl.

CPC .............. *B64D 1/12* (2013.01); *A01G 23/095* (2013.01); *B64C 27/06* (2013.01)

(58) Field of Classification Search

CPC .......... B64C 27/06; B64D 1/12; A01G 23/095
See application file for complete search history.

(56) References Cited

U.S. PATENT DOCUMENTS

| | | | |
|---|---|---|---|
| 3,266,633 A | 8/1966 | Graebner | |
| 3,566,526 A | 3/1971 | Violette | |
| 3,688,952 A | 9/1972 | Barlow et al. | |
| 3,746,177 A | 7/1973 | Vilotti | |
| 3,847,085 A * | 11/1974 | Rypinski | B61B 15/00 104/89 |
| 4,554,781 A | 11/1985 | Rogers | |
| 4,815,263 A | 3/1989 | Hartung et al. | |
| 4,936,038 A | 6/1990 | Johnson et al. | |
| 4,984,757 A | 1/1991 | Hartung et al. | |
| D346,950 S | 5/1994 | Dunn et al. | |
| 5,417,304 A | 5/1995 | Kurtgis | |

(Continued)

FOREIGN PATENT DOCUMENTS

| | | |
|---|---|---|
| DE | 102015002324 | 2/2015 |
| FI | 122944 B1 | 9/2012 |
| WO | WO2004103063 A1 | 12/2004 |

*Primary Examiner* — Robert J McCarry, Jr.
(74) *Attorney, Agent, or Firm* — Ward and Smith, P.A.; Ryan K. Simmons

(57) ABSTRACT

An aerial emergency load release mechanism system. The aerial emergency load release mechanism system may include a frame assembly, which may include a pair of side frame assemblies; and a cross frame assembly extending between the pair of side frame assemblies. The aerial emergency load release mechanism system may further include first and second quick-release hook assemblies connected to the cross frame assembly; and a load coupler having an upper end releasably attachable to the first and second quick-release hook assemblies, and a lower end with a releasable load attachment point.

11 Claims, 42 Drawing Sheets

(56) References Cited

U.S. PATENT DOCUMENTS

| | | | | |
|---|---|---|---|---|
| D359,411 | S | 6/1995 | Miller | |
| 5,850,991 | A | 12/1998 | Hainsworth et al. | |
| 5,937,559 | A | 8/1999 | Jennen | |
| 5,961,070 | A | 10/1999 | Bradford et al. | |
| D449,977 | S | 11/2001 | Dembowiak et al. | |
| 6,394,156 | B1 | 5/2002 | Ahvenlampi et al. | |
| 6,408,906 | B1 | 6/2002 | Moon | |
| 6,425,560 | B1 | 7/2002 | Dembowiak et al. | |
| 6,491,271 | B1 | 12/2002 | Adams | |
| 6,793,184 | B2 | 9/2004 | Dougal et al. | |
| 7,963,406 | B2 | 6/2011 | Kinsella | |
| 8,534,608 | B1 * | 9/2013 | Cox, IV | A01G 23/095 244/137.4 |
| 9,456,559 | B2 | 10/2016 | Dunn | |
| 10,624,279 | B1 | 4/2020 | Mead | |
| 10,869,433 | B1 | 12/2020 | Haddock | |
| 11,352,237 | B2 | 6/2022 | Ragnarsson | |
| 11,696,536 | B2 | 7/2023 | Clark | |
| 12,096,724 | B2 | 9/2024 | Cox, IV | |
| 2003/0159757 | A1 | 8/2003 | Tingstad | |
| 2004/0000409 | A1 | 1/2004 | Abbott | |
| 2008/0105332 | A1 | 5/2008 | Lippits | |
| 2009/0000699 | A1 | 1/2009 | Savege | |
| 2014/0299230 | A1 | 10/2014 | Cox | |
| 2016/0205872 | A1 | 7/2016 | Chan | |

* cited by examiner

AERIAL EMERGENCY LOAD RELEASE MECHANISM SYSTEM AND METHOD FOR AN AERIAL TRANSPORT SYSTEM

RELATED APPLICATIONS

This application is related and claims priority to U.S. Provisional Patent Application No. 63/619,544, filed on Jan. 10, 2024 the application of which is incorporate herein by reference in its entirety.

TECHNICAL FIELD

The subject matter of the invention relates generally to tree trimming systems and methods, and more particularly to an aerial emergency load release dual-hook mechanism for an aerial transport system.

BACKGROUND

It is known to trim tree limbs and other vegetation alongside power lines (e.g., side trimming of rights-of-way) using an airborne system including, for example, of a helicopter having a trimming apparatus suspended beneath the helicopter. Further, in these airborne systems, the trimming apparatus may be a motorized arrangement of saw blades. Helicopters are also used to carry other external loads such as cargo, water containers, vehicles, etc., suspended on an attachment member, such as a cable, extending downwardly beneath the helicopter. As used herein, the term "load" is used to generally refer to cargo, trimming apparatus and other objects transported while suspended beneath a helicopter.

One risk in transporting a load beneath a helicopter is that the load can become entangled in vegetation or other objects on the ground, halting movement of the helicopter. Depending on the terrain, the helicopter may be prevented from landing, which can result in the helicopter crashing, causing damage to the helicopter and more importantly, injury or even death to the pilot. Helicopter malfunctions and other emergencies may also result in a need to jettison the load from the helicopter.

To address these concerns, helicopters used to transport external loads commonly include an emergency release mechanism (or load jettisoning mechanism). These emergency release mechanisms can include a quick-release hook that can be actuated by the pilot or co-pilot to separate the attachment member and supported load from the helicopter.

However, a drawback of a quick and easy hook release is that a mechanical failure may occur and inadvertently cause the hook release to fail and release the load. Considerable cost can result from detaching a load from a helicopter due to lost time, damage to the load, retrieval of the load, and damage to objects struck by the load when it is dropped. For example, a trimming apparatus dropped from a helicopter adjacent power lines can sever power lines or cause fires, resulting in loss of power for considerable periods. Therefore, there is a need for an aerial emergency release mechanism having features that can minimize the likelihood of an inadvertent jettisoning of the load.

SUMMARY

In one embodiment, an aerial emergency load release mechanism system is provided. The aerial emergency load release mechanism system may include a frame assembly, which may include a pair of side frame assemblies; and a cross frame assembly extending between the pair of side frame assemblies. The aerial emergency load release mechanism system may further include first and second quick-release hook assemblies connected to the cross frame assembly; and a load coupler having an upper end releasably attachable to the first and second quick-release hook assemblies, and a lower end with a releasable load attachment point. The first and second quick-release hook assemblies may be individually controllable between a release and closed position. The aerial emergency load release mechanism system may be configured to couple to and suspend therefrom a releasable load via the load coupler, and wherein the aerial emergency load release mechanism system may be configure to provide a quick-release of the releasable load. Each of the first and second quick-release hook assemblies may include a quick-release hook, and wherein the releasable load is not released unless both of the quick-release hooks of the first and second quick-release hook assemblies are released. The aerial emergency load release mechanism system may be configured to couple to an underside of an aircraft. The releasable load may include an aerial saw. Each one of the pair of side frame assemblies may include a first upper side frame member; a second upper side frame member, wherein the second upper side frame member may be connected at a first end thereof in an end to end fashion with a first end of the first upper side frame member, the connected first upper side frame member and second upper side frame member may form a somewhat flattened V shape; a first lower side frame member; a second lower side frame member, wherein the second lower side frame member may be connected at a first end thereof in an end to end fashion to a first end of the first lower side frame member via a side connector member the connected first lower side frame member and second lower side frame member may form a generally V shape; a vertical frame member extending from an intersection of the first upper side frame member and the second upper side frame member down to the side connector member; a side frame connector disposed at a second end of the first lower side frame member; a shackle disposed at a second end of the second lower side frame member; and wherein the side frame connector and the shackle may be configured for attachment to a chassis of an aircraft, and wherein a second end of the first upper side frame member may be connected to an area of the second end of the first lower side frame member proximate to the side frame connector and a second end of the second upper side frame member may be connected to an area of the second end of the second lower side frame member proximate to the shackle. The cross frame assembly may include an upper horizontal bar member; a first lower horizontal bar member and a second lower horizontal bar member, wherein the first lower horizontal bar member and the second lower horizontal bar member may be arranged in parallel and in the same horizontal plane with one another, the first lower horizontal bar member and the second lower horizontal bar member vertically spaced apart from and parallel with the upper horizontal bar member; first and second vertical bar members spaced apart and parallel with one another, and arranged vertically between the upper horizontal bar member and the first and second lower horizontal bar members, wherein the first and second lower horizontal bar members may be configured such that the first lower horizontal bar member may be disposed on a first side of an end portion of the first and second vertical bar members and the second lower horizontal bar member may be disposed on a second opposing side of the end portion of the first and second vertical bar members thereby forming a gap between the first and second lower horizontal bar members; and a slip tube socket may be formed by the gap formed between the first and second horizontal lower bar members. The load coupler may include a coupler housing, wherein the coupler housing may be configured to slideable fit within a slip tube socket of the cross frame assembly; a grab bar disposed at an upper portion of the coupler housing, wherein the grab bar may be configure to be fitted into and held by the first and second quick-release hook assemblies; a swivel connector disposed at a lower portion of the coupler housing, wherein the swivel connector may be configured to couple to the releasable load; and wherein when released quick-release hooks of the first and second quick-release hook assemblies release the grab bar and the load coupler slides through the slip tube socket with the releasable load coupled thereto, thereby jettisoning the releasable load from the aircraft. The aircraft may be a helicopter. The first quick-release hook assembly and the second quick-release hook assembly may each be individually actuated from a closed to release position or from a release to closed position by one or more actuators located within the aircraft. The one or more actuators may include any of one or more buttons, levers, switches, toggles, and/or triggers.

In another embodiment, a method of using an aerial emergency load release mechanism system is provided. The method may include providing an aerial transport system including an aerial emergency load release mechanism system, the aerial emergency load release mechanism system may include a frame assembly. The frame assembly may include a pair of side frame assemblies; and a cross frame assembly extending between the pair of side frame assemblies. The aerial emergency load release mechanism system may include first and second quick-release hook assemblies connected to the cross frame assembly, each of the first and second quick-release hook assemblies may include a quick-release hook; and a load coupler having an upper end releasably attached to the first and second quick-release hook assemblies, and a lower end with a releasable load attachment point. The method may further coupling a releasable load to the attachment point of the load coupler; suspending the coupled releasable load from an aircraft to which the aerial emergency load release mechanism system is attached to; and upon occurrence of a certain condition, actuating via one or more actuators both of the quick-release hooks of the first and second quick-release hook assemblies to release and jettison the releasable load from the aircraft. The first and second quick-release hook assemblies may be individually controllable between a release and closed position. The releasable load may not be release unless both of the quick-release hooks of the first and second quick-release hook assemblies are released. The aircraft may be a helicopter. The releasable load may be an aerial saw. The load coupler may include a coupler housing, wherein the coupler housing may be configured to slideable fit within a slip tube socket of the cross frame assembly; a grab bar disposed at an upper portion of the coupler housing, wherein the grab bar may be configure to be fitted into and held by the first and second quick-release hook assemblies; a swivel connector disposed at a lower portion of the coupler housing, wherein the swivel connector may be configured to couple to the releasable load; and wherein when released quick-release hooks of the first and second quick-release hook assemblies release the grab bar and the load coupler slides through the slip tube socket with the releasable load coupled thereto, thereby jettisoning the releasable load from the aircraft. The first quick-release hook assembly and the second quick-release hook assembly may each be individually actuated from a closed to release position or from a release to closed position by one or more actuators located within the aircraft. The one or more actuators may include any of one or more buttons, levers, switches, toggles, and/or triggers.

BRIEF DESCRIPTION OF THE DRAWINGS

Figure 1:
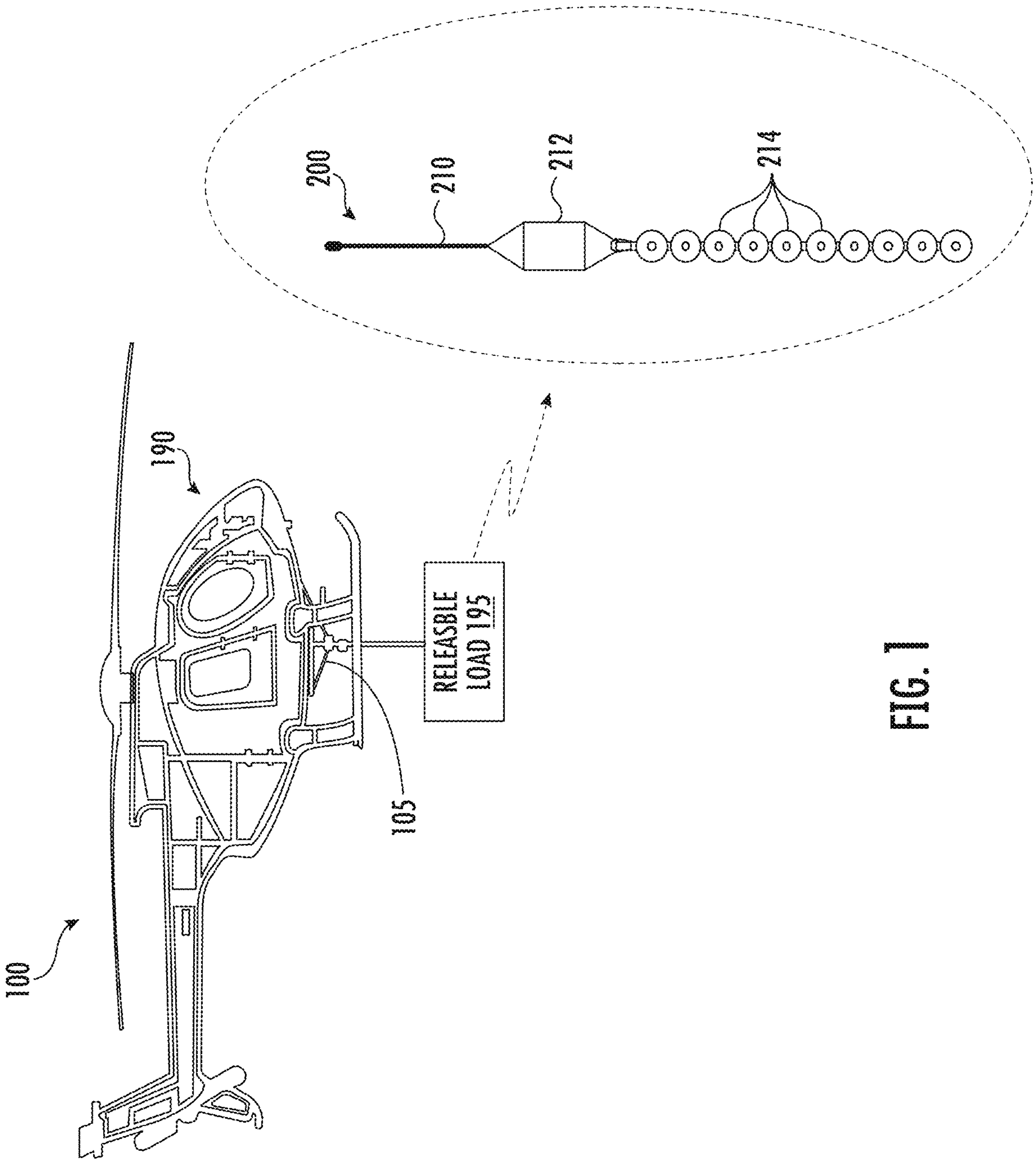
Figure 4:
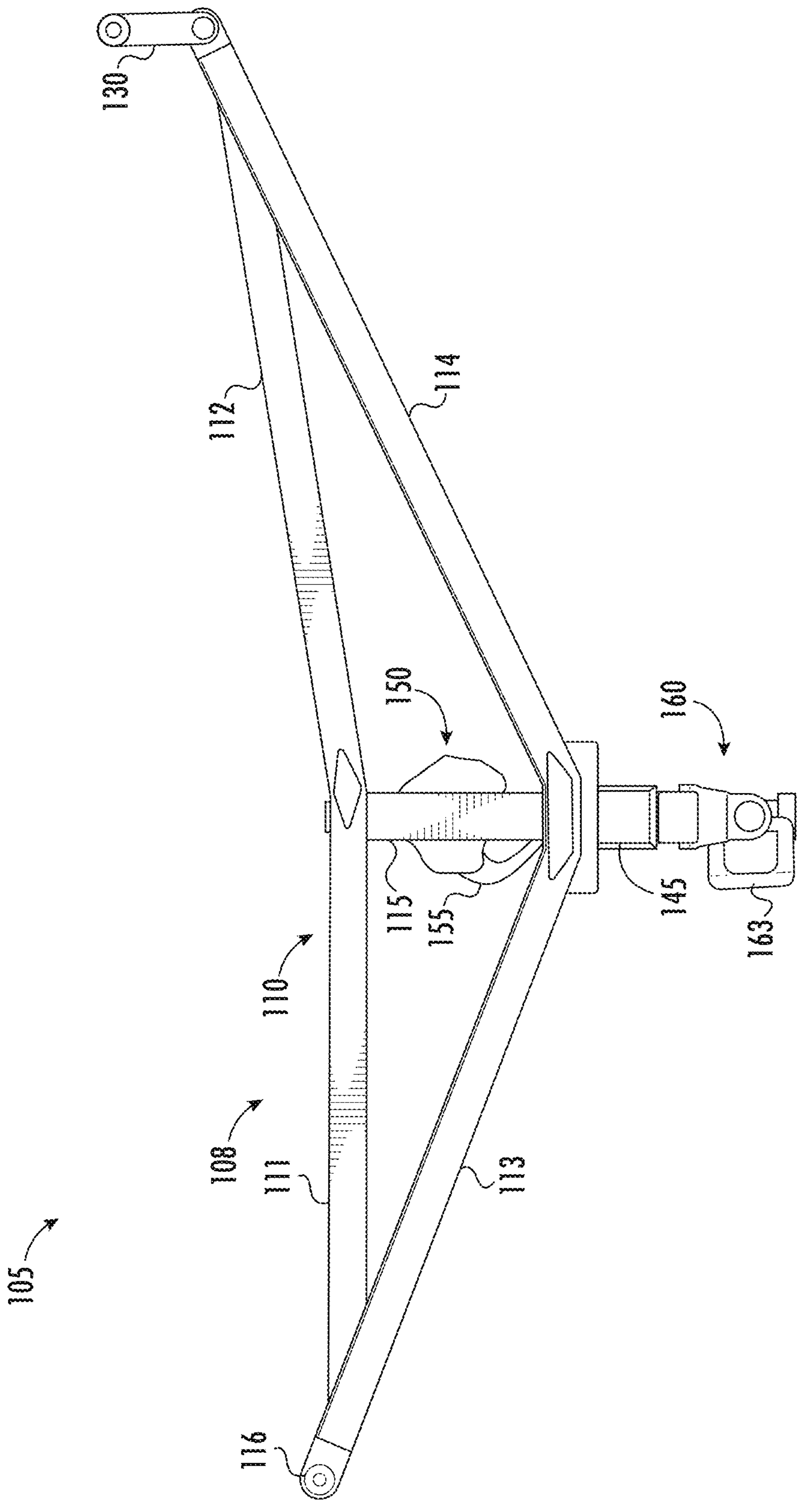
Figure 5:
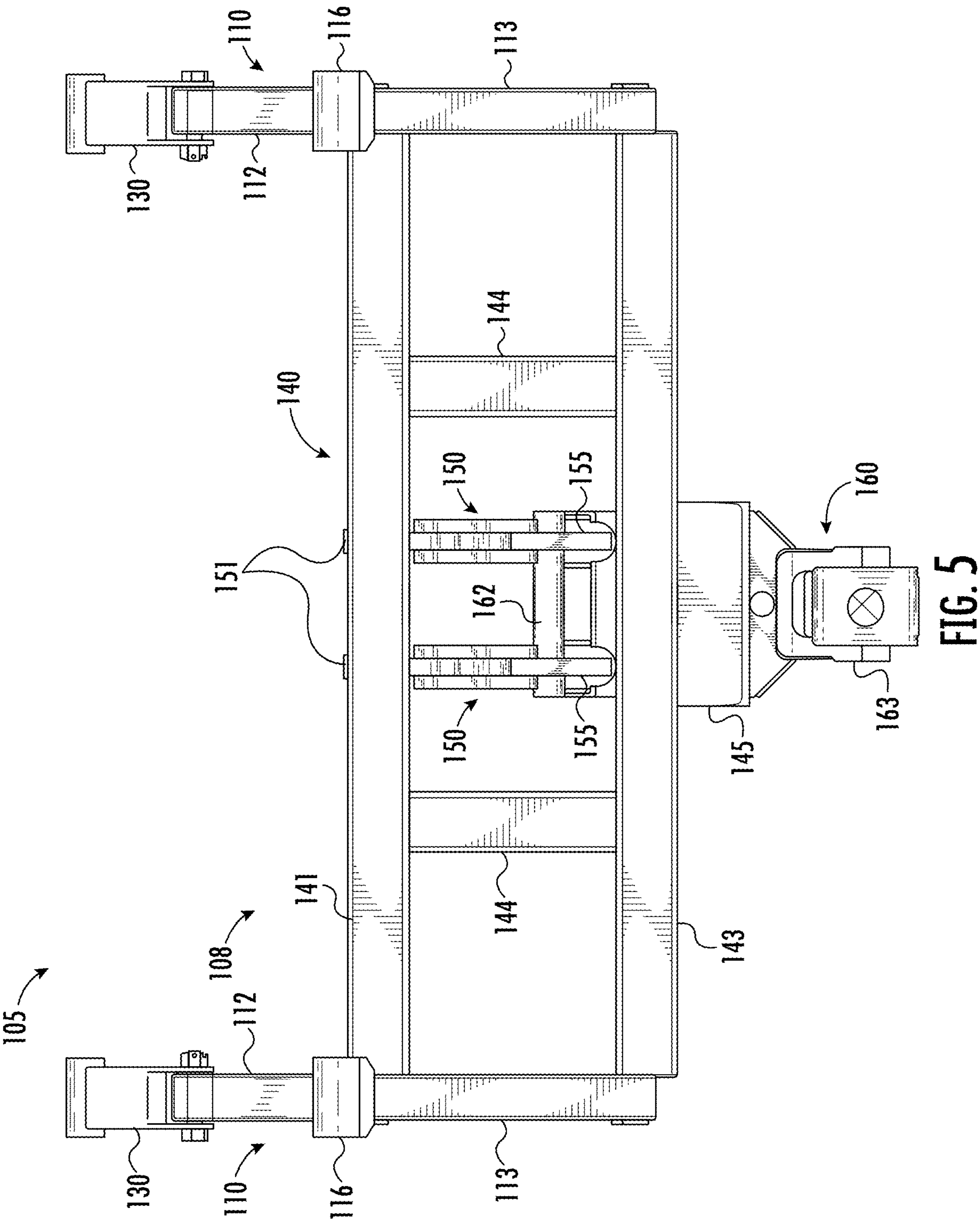
Figure 6:
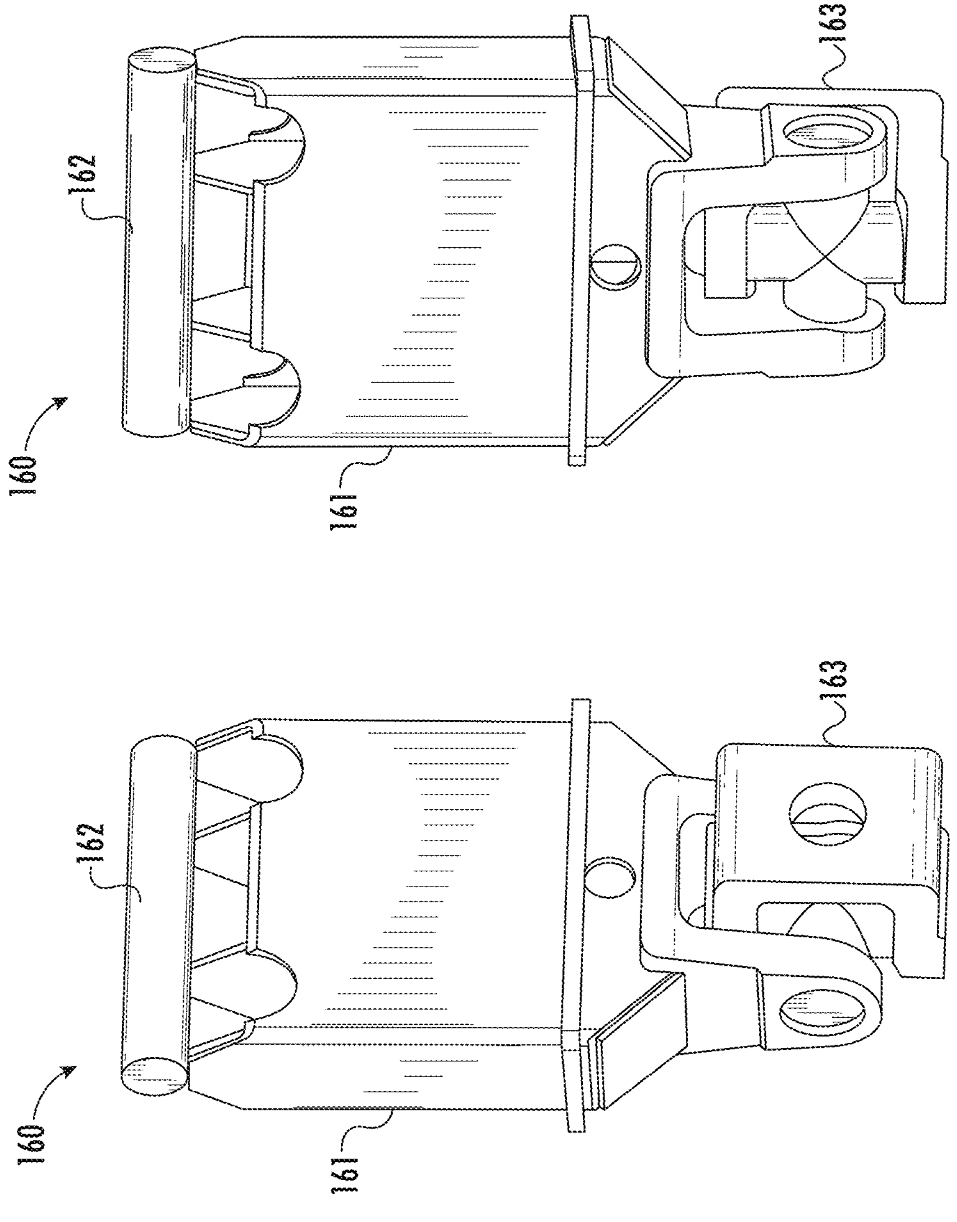
Figure 7:
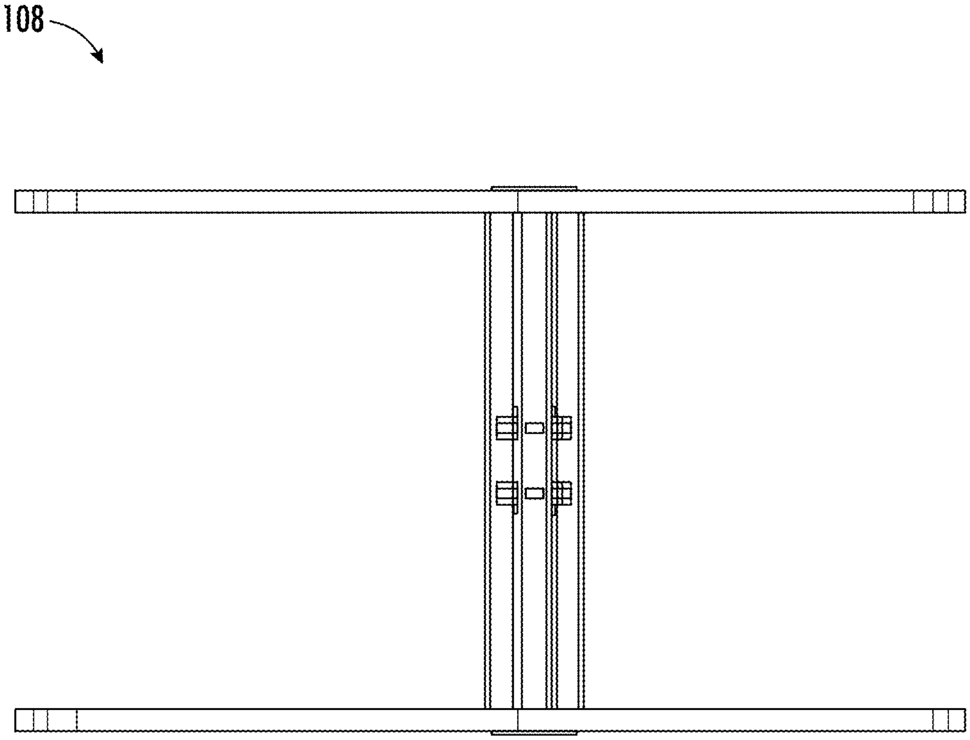
Figure 8:
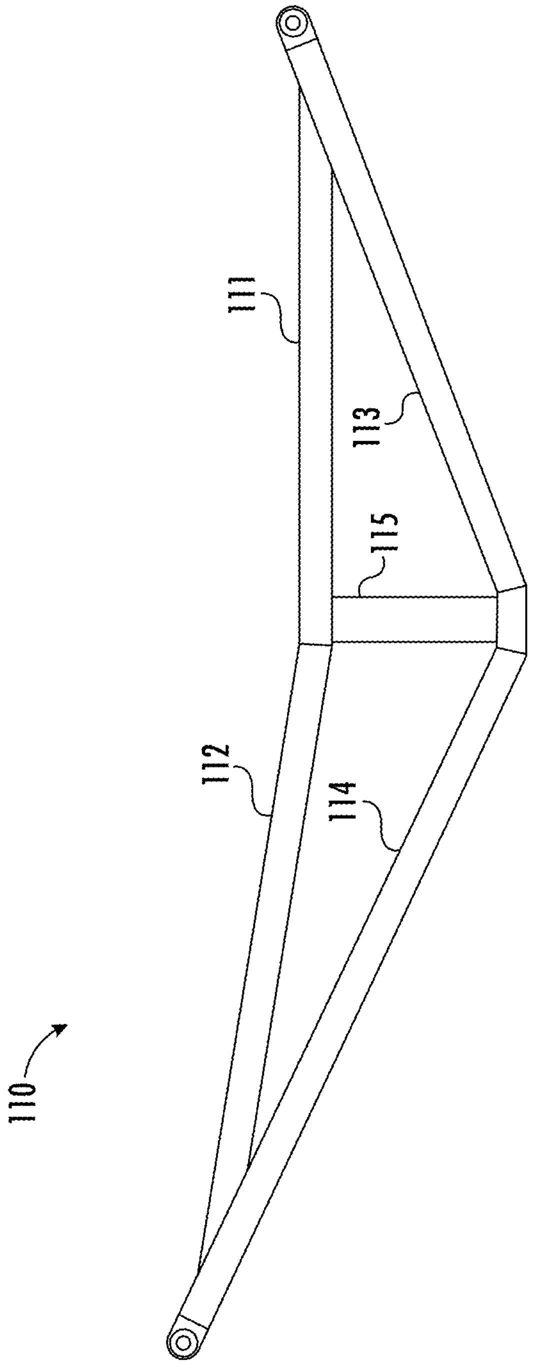
Figure 14:
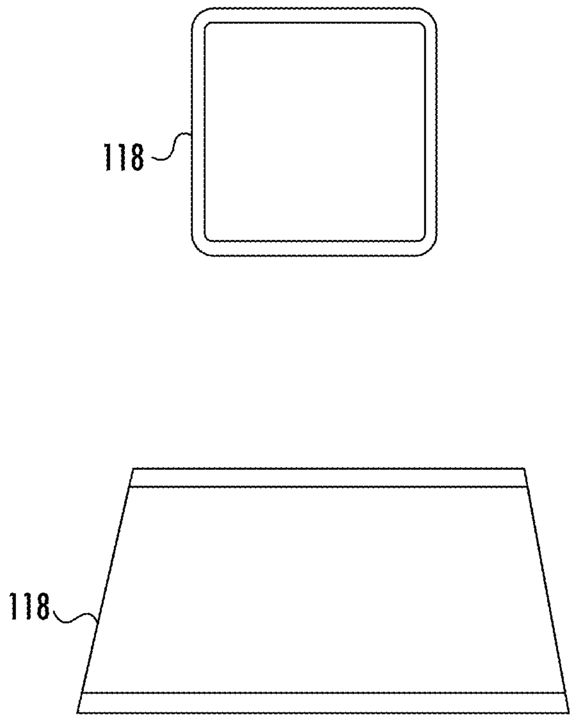
Figure 15:
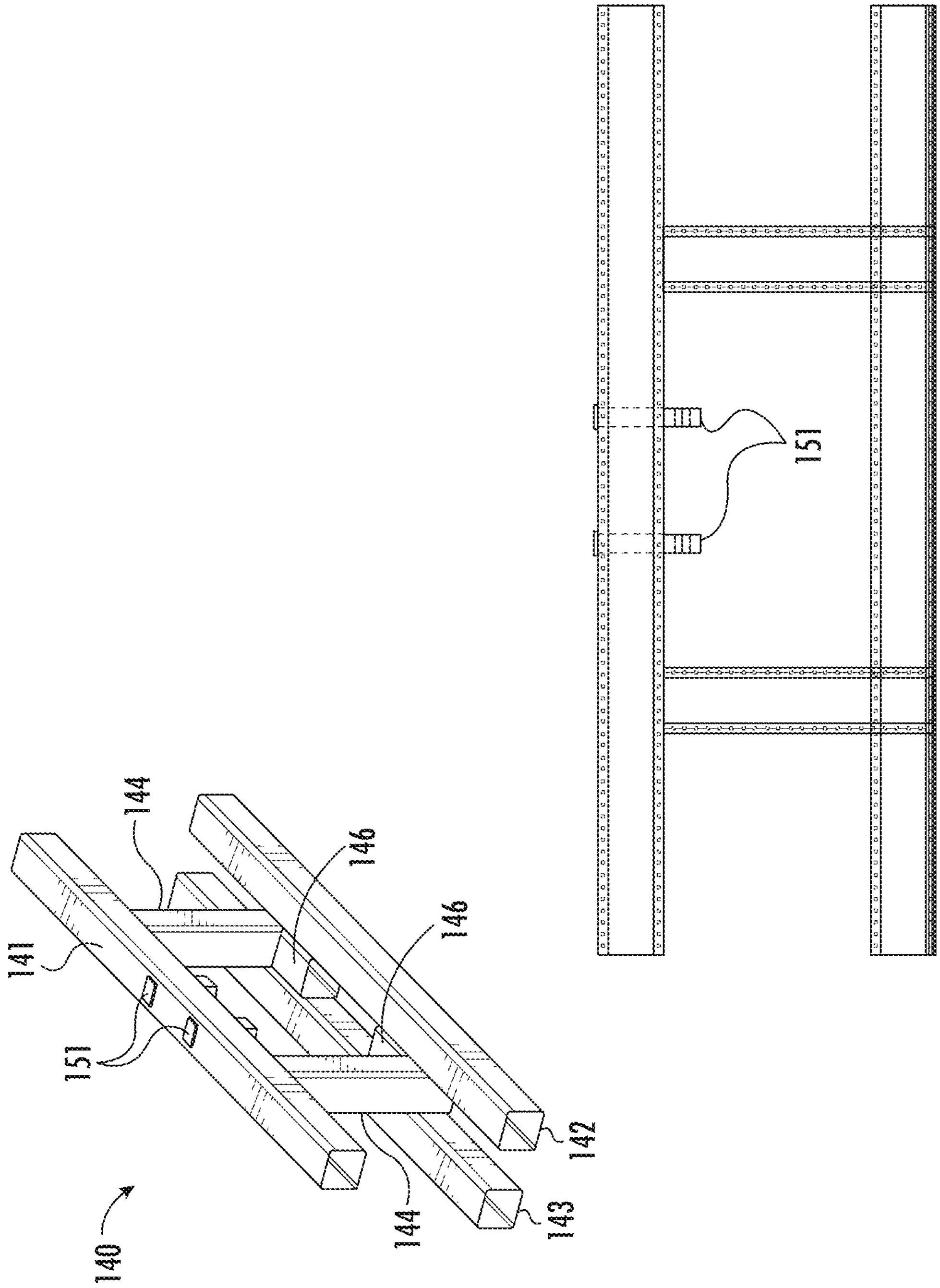
Figure 22:
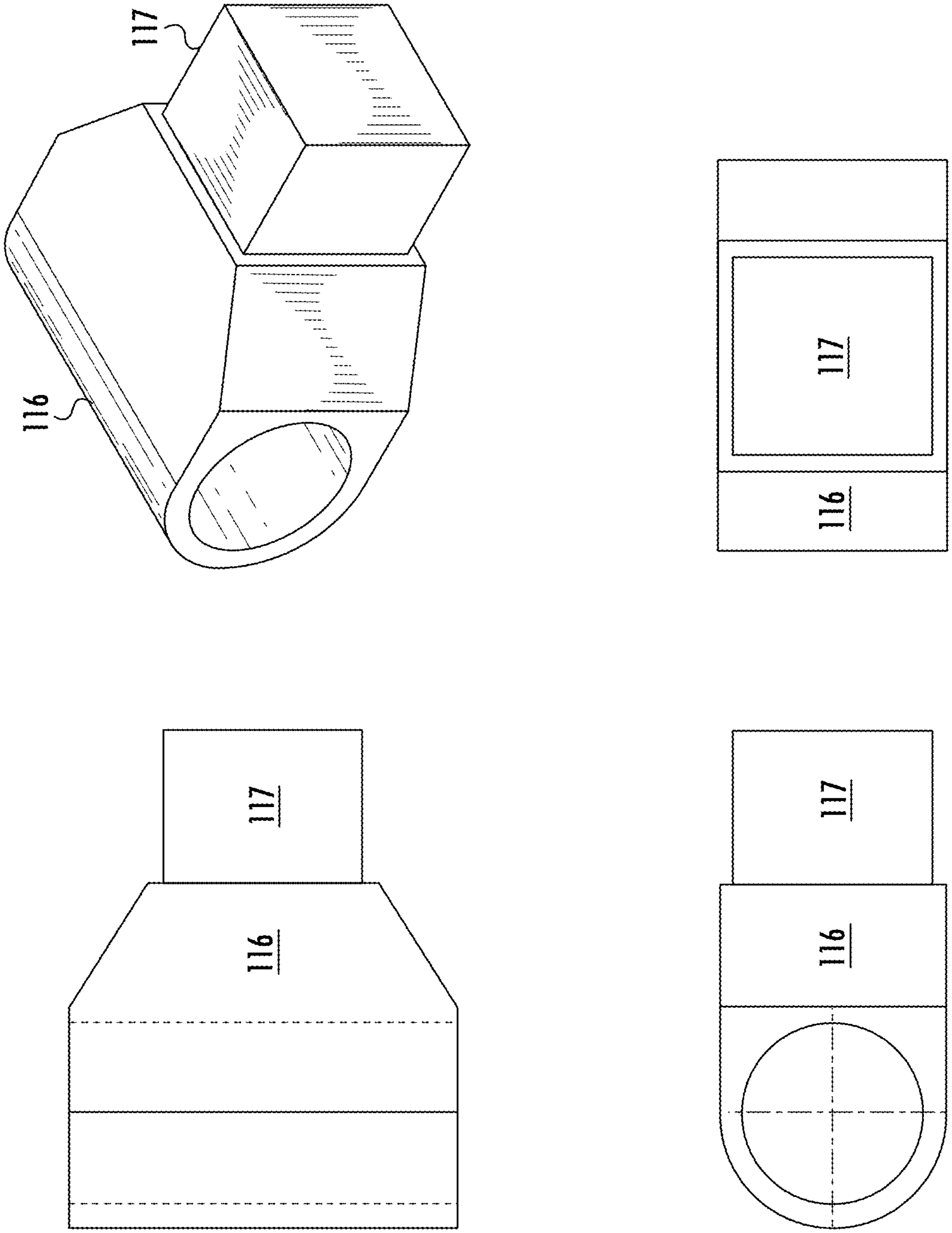
Figure 23:
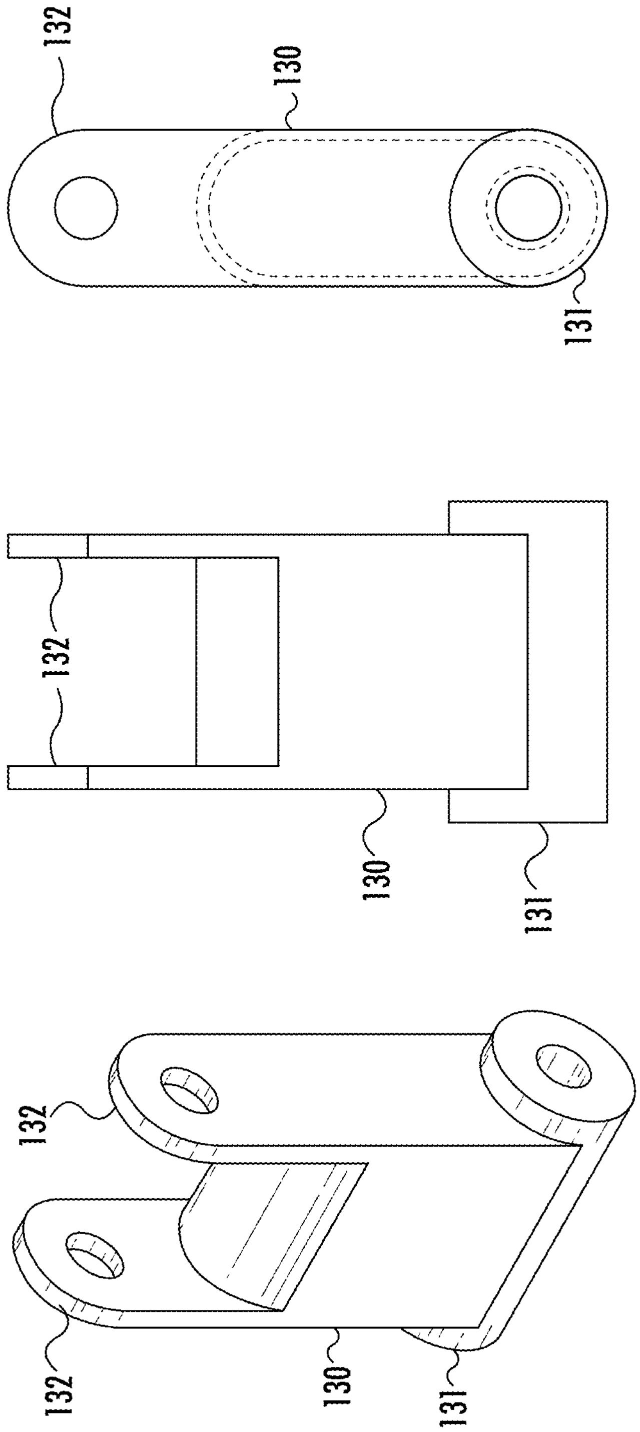
Figure 40:
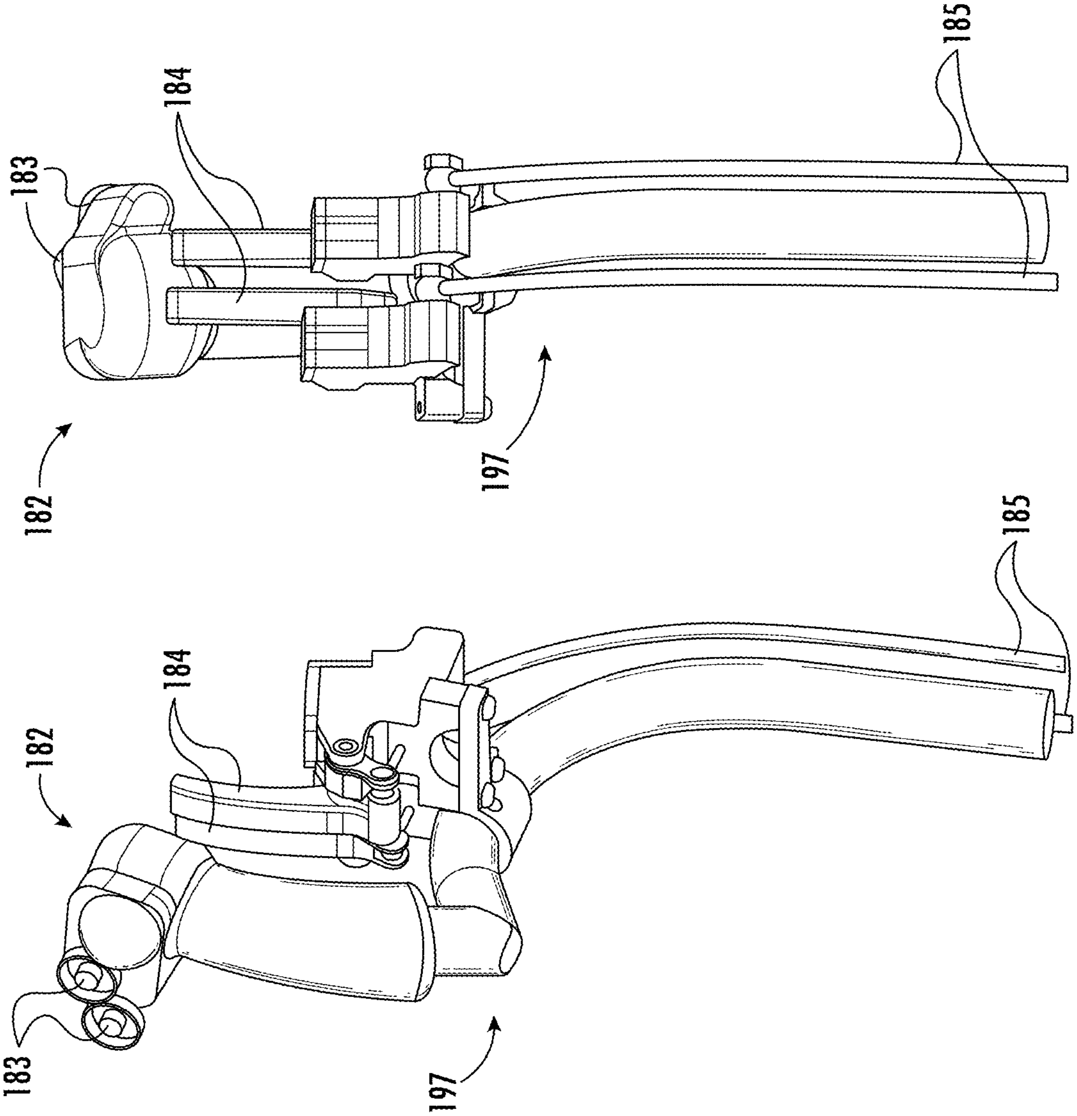
Figure 41:
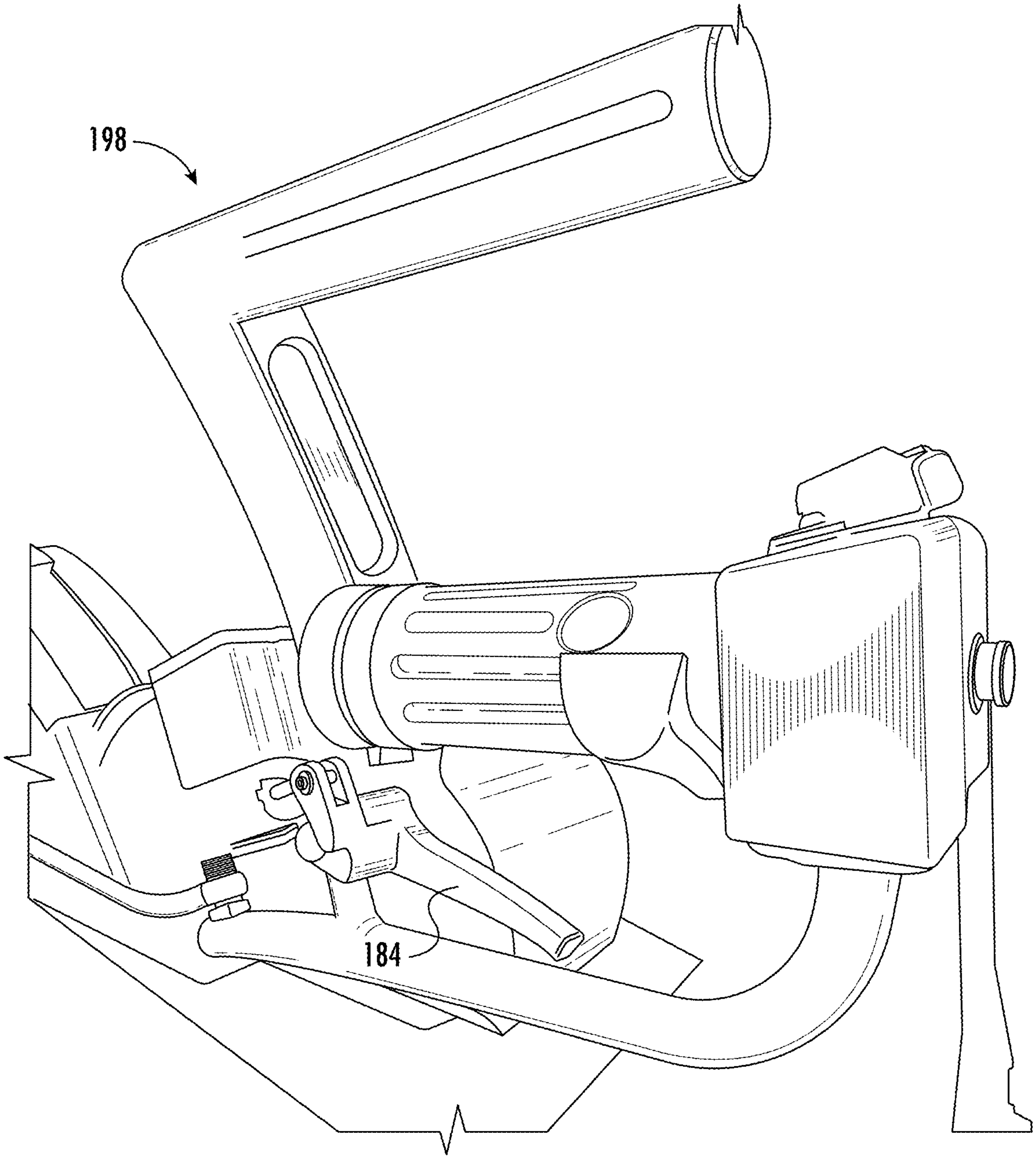
Figure 42:
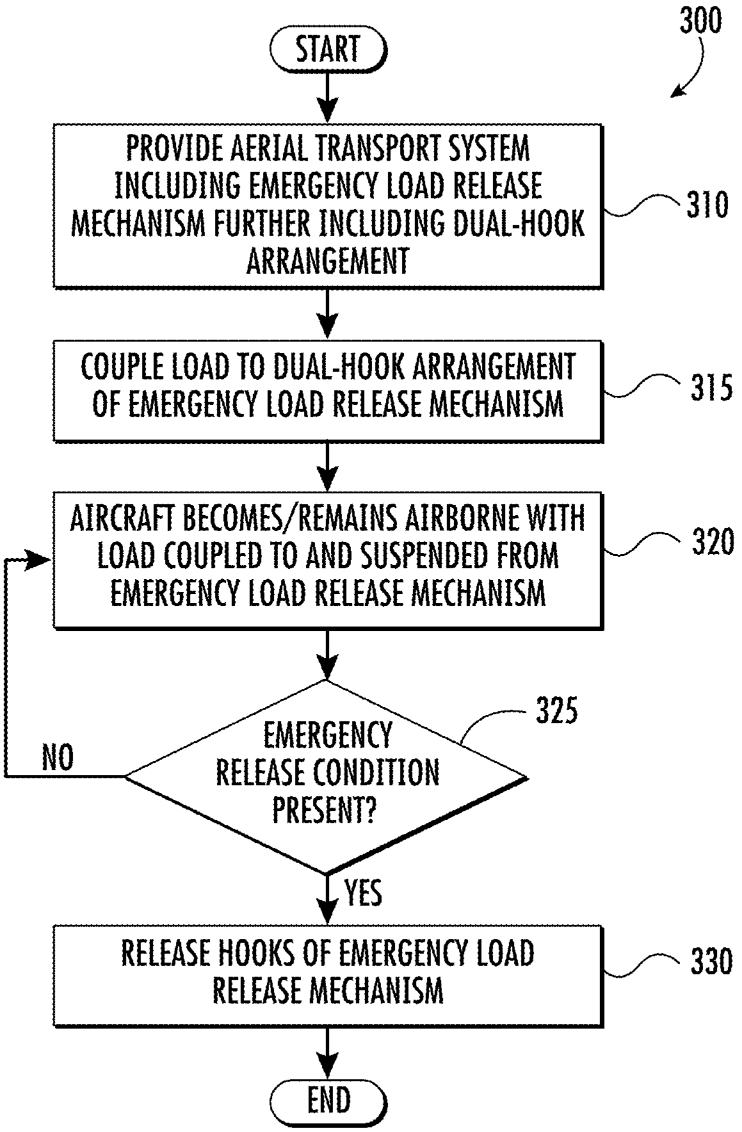

Having thus described the subject matter of the invention in general terms, reference will now be made to the accompanying drawings, which are not necessarily drawn to scale, and wherein:

FIG. 1 illustrates a block diagram of an example of an aerial transport system including an emergency load release mechanism, in accordance with an embodiment of the invention;

FIG. 2, FIG. 3, FIG. 4, and FIG. 5 illustrate various views of an example of the emergency load release mechanism of the aerial transport system shown in FIG. 1, in accordance with an embodiment of the invention;

FIG. 6 illustrates perspective views of an example of a load coupler of the emergency load release mechanism shown in FIG. 2, FIG. 3, FIG. 4, and FIG. 5, in accordance with an embodiment of the invention;

FIG. 7 and FIG. 8 illustrate a top view and side view, respectively, of an example of a trapeze assembly of the emergency load release mechanism shown in FIG. 2, FIG. 3, FIG. 4, and FIG. 5, in accordance with an embodiment of the invention;

FIG. 9 through FIG. 13 illustrate various views of example frame member components of the trapeze assembly of the emergency load release mechanism shown in FIG. 2, FIG. 3, FIG. 4, and FIG. 5, in accordance with an embodiment of the invention;

FIG. 14 illustrates an example side connector member component of the trapeze assembly of the emergency load release mechanism shown in FIG. 2, FIG. 3, FIG. 4, and FIG. 5, in accordance with an embodiment of the invention;

FIG. 15 illustrates a perspective and cross-sectional side view of an example cross frame assembly component of the trapeze assembly of the emergency load release mechanism shown in FIG. 2, FIG. 3, FIG. 4, and FIG. 5, in accordance with an embodiment of the invention;

FIG. 16 through FIG. 21 illustrate various views of various example components of the cross frame assembly of the trapeze assembly of the emergency load release mechanism shown in FIG. 2, FIG. 3, FIG. 4, FIG. 5, and FIG. 15, in accordance with an embodiment of the invention;

FIG. 22 illustrates a perspective view of an example side frame assembly side frame connector of the trapeze assembly of the emergency load release mechanism shown in FIG. 2, FIG. 3, FIG. 4, and FIG. 5, in accordance with an embodiment of the invention;

FIG. 23 illustrates a perspective view of an example side frame assembly shackle component of the trapeze assembly of the emergency load release mechanism shown in FIG. 2, FIG. 3, FIG. 4, and FIG. 5, in accordance with an embodiment of the invention;

FIG. 24 through FIG. 27 illustrate various views of certain example assembly components of the trapeze assembly of the emergency load release mechanism shown in FIG. 2, FIG. 3, FIG. 4, and FIG. 5, in accordance with an embodiment of the invention;

FIG. 28 through FIG. 31 illustrate examples of a trapeze assembly of the emergency load release mechanism attached to the underside of a helicopter, in accordance with an embodiment of the invention;

FIG. 32 through FIG. 39 illustrate an example process of using the emergency load release mechanism shown in FIG. 2, FIG. 3, FIG. 4, and FIG. 5, in accordance with an embodiment of the invention;

FIG. 40 illustrates perspective views of an example trigger mechanism of the aerial transport system shown in FIG. 1, in accordance with an embodiment of the invention;

FIG. 41 illustrates a perspective view of an example collective of the aerial transport system shown in FIG. 1 with a release lever, in accordance with an embodiment of the invention; and FIG. 42 illustrates a flow diagram of an example method of using the aerial emergency load release mechanism, in accordance with an embodiment of the invention.

DETAILED DESCRIPTION

The subject matter of the invention now will be described more fully hereinafter with reference to the accompanying drawings, in which some, but not all embodiments of the subject matter of the invention are shown. Like numbers refer to like elements throughout. The subject matter of the invention may be embodied in many different forms and should not be construed as limited to the embodiments set forth herein; rather, these embodiments are provided so that this disclosure will satisfy applicable legal requirements. Indeed, many modifications and other embodiments of the subject matter of the invention set forth herein will come to mind to one skilled in the art to which the subject matter of the invention pertains having the benefit of the teachings presented in the foregoing descriptions and the associated drawings. Therefore, it is to be understood that the subject matter of the invention is not to be limited to the specific embodiments disclosed and that modifications and other embodiments are intended to be included within the scope of the appended claims.

In some embodiments, the subject matter of the invention provides an emergency dual-hook load release mechanism system and method for an aerial transport system for minimizing an inadvertent load release.

In some embodiments, the aerial transport system and method may provide an aircraft (e.g., a helicopter) and any kind of load coupled to and suspended from an emergency load release mechanism mounted to the underside of the aircraft.

In some embodiments, the aerial transport system and method may be configured as an aerial tree trimming system including a helicopter and an aerial saw (i.e., the load) coupled to and suspended from an emergency load release mechanism mounted to the underside of the helicopter.

In some embodiments, the aerial transport system and method may provide an emergency load release mechanism including a trapeze assembly, at least two hook assemblies, a load coupler attached to a load, and a trigger mechanism.

In some embodiments, the aerial transport system and method may provide an emergency load release mechanism including at least two hook assemblies that may be individually controlled using a trigger mechanism located inside the aircraft (e.g., a helicopter).

In some embodiments, the aerial transport system and method may provide at least two individually controlled quick-release hooks in an emergency release mechanism to prevent an inadvertent drop of the load if one of the two hook release mechanisms fail, or by which the pilot or co-pilot may be forced or at least encouraged to consider whether an emergency release condition is truly present or not present between triggering the first quick-release hook and triggering the second quick-release hook thereby minimizing the likelihood of an inadvertent or panic jettisoning of the load when an emergency release is not actually required.

Further, a method is provided for using the emergency load release mechanism of the aerial transport system including a dual-hook arrangement for minimizing an inadvertent load release.

Referring now to FIG. 1 is a block diagram of an example of an aerial transport system 100 including an emergency load release mechanism 105 with a dual-hook arrangement for minimizing an inadvertent load release, in accordance with an embodiment of the invention.

Aerial transport system 100 may be, for example, an airborne system for holding and transporting a load suspended from the underside of an aircraft. Further, aerial transport system 100 includes emergency load release mechanism 105 coupled to the underside of a helicopter 190. In this example, a releasable load 195 may be couple to and suspended from emergency load release mechanism 105. Emergency load release mechanism 105 provides a quick-release mechanism for releasing the releasable load 195, for example, in the event of an emergency. That is, emergency load release mechanism 105 may include a quick-release dual-hook arrangement that can be actuated by the pilot or co-pilot to separate releasable load 195 from helicopter 190.

In one example, aerial transport system 100 may be configured as an aerial tree trimming system. In this example, releasable load 195 may be an aerial saw 200, as shown in FIG. 1. Aerial saw 200 may be, for example, an electric-powered or gas-powered aerial saw. Aerial saw 200 may include, for example, a boom 210 that may be coupled to emergency load release mechanism 105 of helicopter 190. The other end of boom 210 that may be coupled to a motor 212 (e.g., electric-powered or gas-powered motor) that is driving an arrangement of saw blades 214 (i.e., rotatable cutting blades) arranged, for example, in a line along a beam. The number and/or size of saw blades 214 may vary depending on use and application.

In the example of aerial transport system 100 configured as an aerial tree trimming system, aerial saw 200 may be suspended from a flying helicopter 190 and used to side-trim rights-of-way through vegetation for major power, pipeline, railroad companies, and the like. Aerial transport system 100 including aerial saw 200 suspended from helicopter 190 may be capable of removing the canopy in rights-of-way by trimming from sky to ground. For example, aerial transport system 100 including aerial saw 200 may be used in the trimming/maintenance of various utility rights-of-way including, but not limited to, power line, gas, railroad, pasture, orchards, and the like.

In aerial transport system 100, releasable load 195 may be attached to helicopter 190 using emergency load release mechanism 105. A main feature of emergency load release mechanism 105 may be a dual-hook arrangement. That is, emergency load release mechanism 105 including at least two individually controlled quick-release hooks and wherein the two hooks provide the emergency release mechanism. In this example, both the first quick-release hook and second quick-release hook are engageable with releasable load 195. To release the releasable load 195 both hooks need to be released because one hook alone is still suitably capable of holding releasable load 195 without the other hook engaged. More details of the dual-hook arrangement of emergency load release mechanism 105 are shown and described below in FIG. 2 through FIG. 5 and FIG. 32 through FIG. 39.

The presence of two individually controlled quick-release hooks in emergency load release mechanism 105 prevents the drop of releasable load 195 in the event one of the two quick-release hooks of the emergency load release mechanism 105 fails, and/or also forces or at least encourages the pilot or co-pilot to consider whether an emergency release condition is truly present or not present between triggering the first quick-release hook and triggering the second quick-release hook. In this way, the presence of two individually controlled quick-release hooks in emergency load release mechanism 105 provides a way to minimize the likelihood of an inadvertent or panic jettisoning of the load when an emergency release is not intended or actually required.

In FIG. 2 through FIG. 39 below, reference to "FRONT" views of emergency load release mechanism 105 means oriented toward or facing the front of helicopter 190. Likewise, reference to "BACK" views of emergency load release mechanism 105 means oriented toward or facing the rear of helicopter 190. However, it is noted that this orientation of emergency load release mechanism 105 is not strictly required, it is exemplary only. Emergency load release mechanism 105 may be operational regardless of its orientation with respect to helicopter 190.

Figure 2:
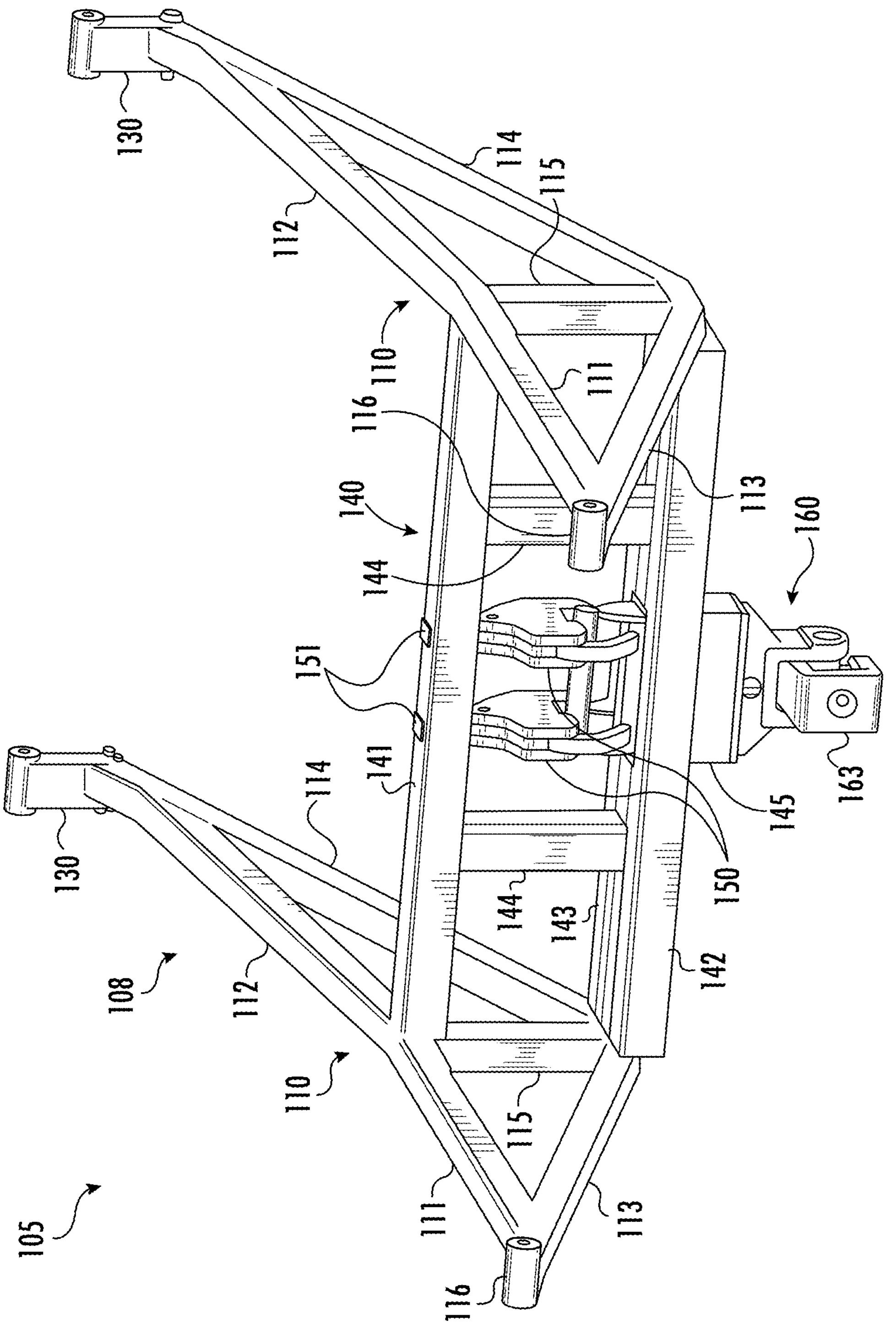
Figure 3:
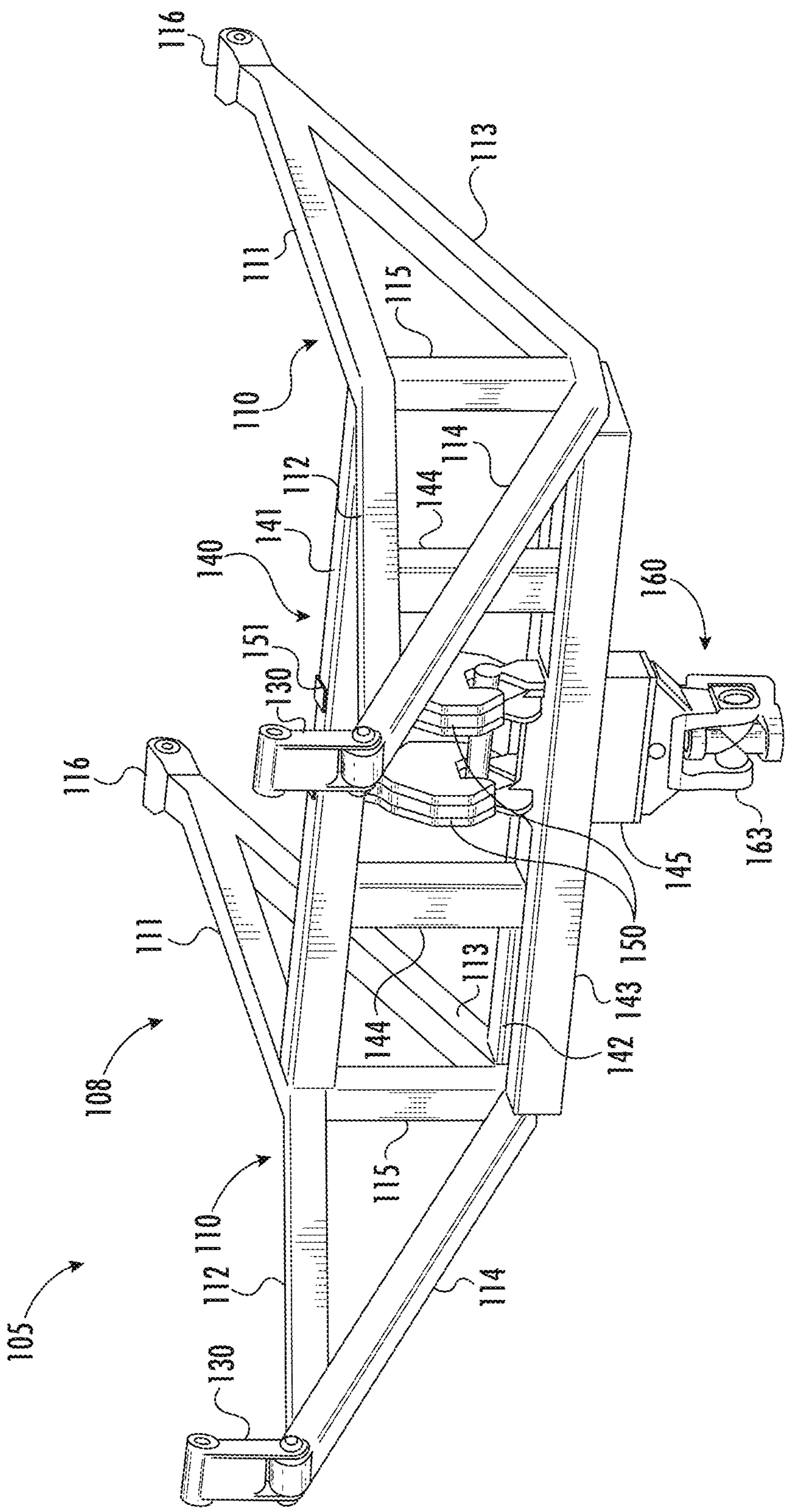

Referring now to FIG. 2, FIG. 3, FIG. 4, and FIG. 5 is various views of an example of emergency load release mechanism 105 of the aerial transport system 100 shown in FIG. 1, in accordance with one example embodiment of the invention. FIG. 2 shows a front perspective view, FIG. 3 shows a back perspective view, FIG. 4 shows a side view, and FIG. 5 shows a front view of emergency load release mechanism 105. In this example, emergency load release mechanism 105 may include a trapeze assembly 108, at least two hook assemblies 150, and a load coupler 160.

Trapeze assembly 108 may include a pair of side frame assemblies 110 with a cross frame assembly 140 arranged therebetween. Each of the side frame assemblies 110 of trapeze assembly 108 may include an upper side frame member 111, an upper side frame member 112, a lower side frame member 113, a lower side frame member 114, a vertical frame member 115, a side frame connector 116 at one end of lower side frame member 113, a side connector member 118 (see FIG. 8) at the intersection of lower side frame member 113 and lower side frame member 114, and a shackle 130 one attached to one end of each of lower side frame members 114.

Cross frame assembly 140 of trapeze assembly 108 may include an upper bar member 141, a lower bar member 142 arranged in parallel with a lower bar member 143, two vertical bar members 144 arranged between upper bar member 141 and lower bar member 142 and lower bar member 143, a slip tube socket 145, and two socket side tubes 146 (one on each side of slip tube socket 145). More details of the various members forming trapeze assembly 108 are shown and described below in FIG. 7 through FIG. 27.

Hook assemblies 150 may be quick-release hooks. In one example, two hook assemblies 150 may be held to upper bar member 141 of cross frame assembly 140 of trapeze assembly 108 via a hook assembly connecting pin 151 (see FIG. 21). Each of the hook assemblies 150 may include a release hook 155. More details of hook assemblies 150 are shown and described below in FIG. 32 through FIG. 39. Further, the release hooks 155 of the two hook assemblies 150 may be individually or collectively controlled via one or more control buttons 183 and/or one or more levers 184 located inside helicopter 190.

Hook assemblies 150 of emergency load release mechanism 105 may be designed to grasp and hold load coupler 160. Referring now to FIG. 6 is perspective views of an example of load coupler 160 of emergency load release mechanism 105 shown in FIG. 2, FIG. 3, FIG. 4, and FIG. 5, in accordance with an embodiment of the invention. In this example, load coupler 160 may include a coupler housing 161, a grab bar 162 at an upper portion of coupler housing 161, and may further include a swivel connector 163 at a lower portion of coupler housing 161. That is, grab bar 162 is designed to be fitted into and held by hook assemblies 150 of emergency load release mechanism 105. Further, coupler housing 161 of load coupler 160 is sized to fit within slip tube socket 145 of trapeze assembly 108. Further, swivel connector 163 is designed to couple to releasable load 195 (e.g., aerial saw 200). In one example, the components of load coupler 160 may be formed of A513 steel or other suitable material. More details of the operation of hook assemblies 150 with respect to load coupler 160 are shown and described below in FIG. 32 through FIG. 41.

Referring now to FIG. 7 and FIG. 8 is a top view and side view, respectively, of trapeze assembly 108 of emergency load release mechanism 105 shown in FIG. 2, FIG. 3, FIG. 4, and FIG. 5, in accordance with an embodiment of the invention. FIG. 7 through FIG. 23 show some example non-limiting dimensions of trapeze assembly 108 and its various components. In one example, the bar members of trapeze assembly 108 may be formed of A513 steel or other suitable material.

Referring now to FIG. 9 through FIG. 23 is various views showing more details of the components forming trapeze assembly 108 of emergency load release mechanism 105 shown in FIG. 2, FIG. 3, FIG. 4, and FIG. 5, in accordance with an embodiment of the invention. Again, in one example, the bar members of trapeze assembly 108 may be formed of A513 steel or other suitable material.

Figure 9:
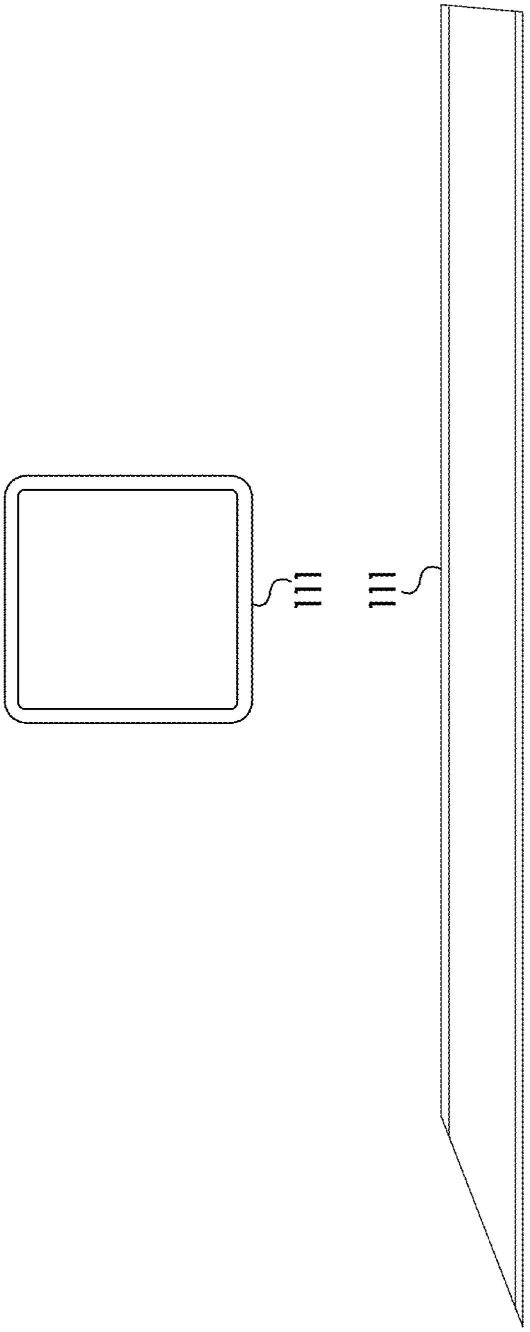
Figure 10:
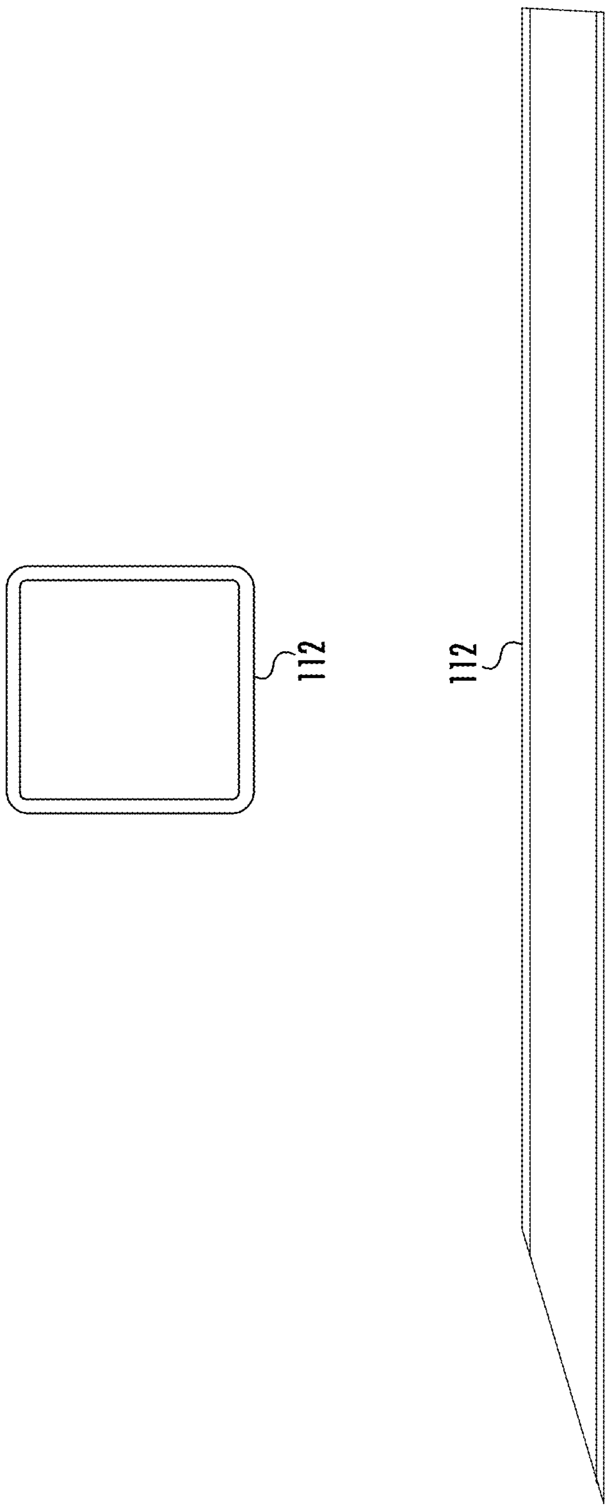
Figure 11:
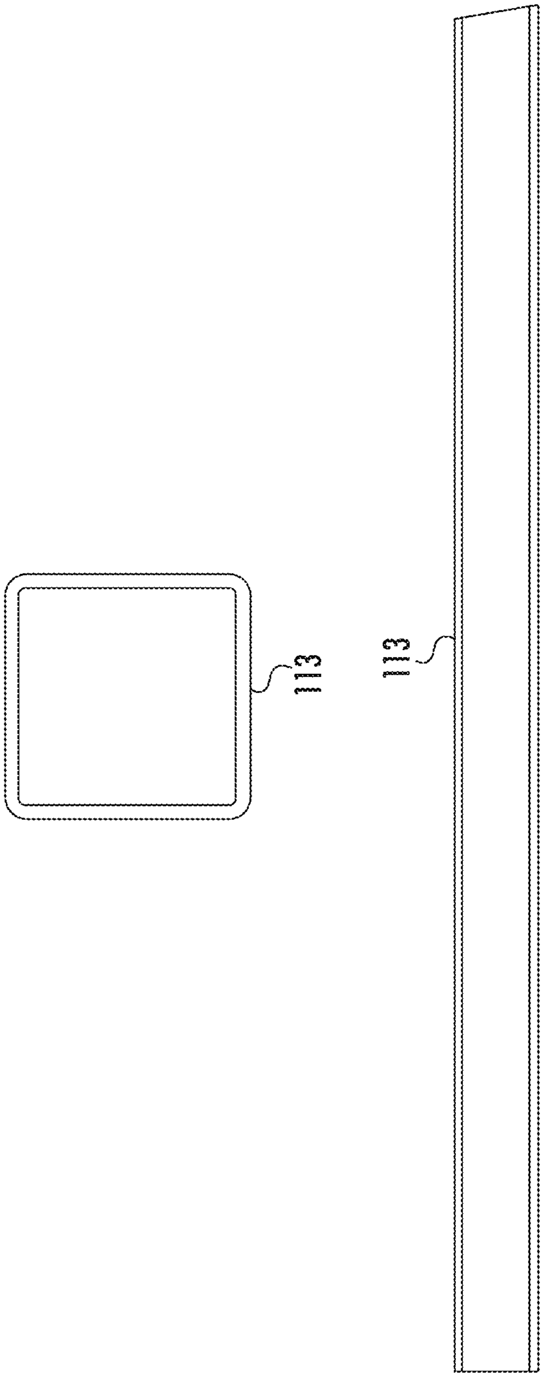
Figure 12:
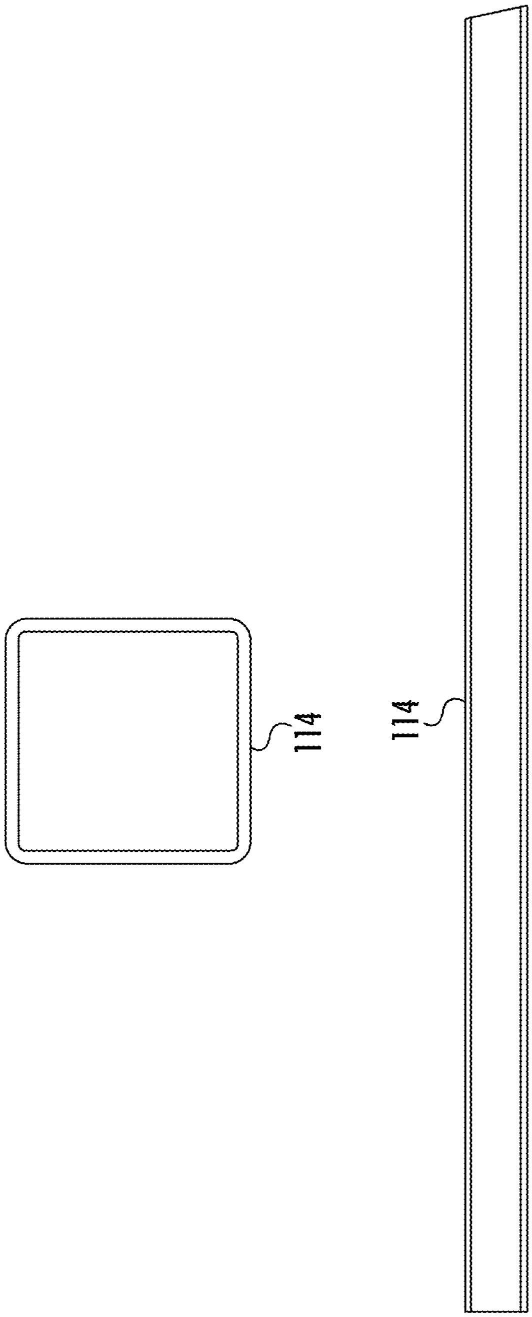
Figure 13:
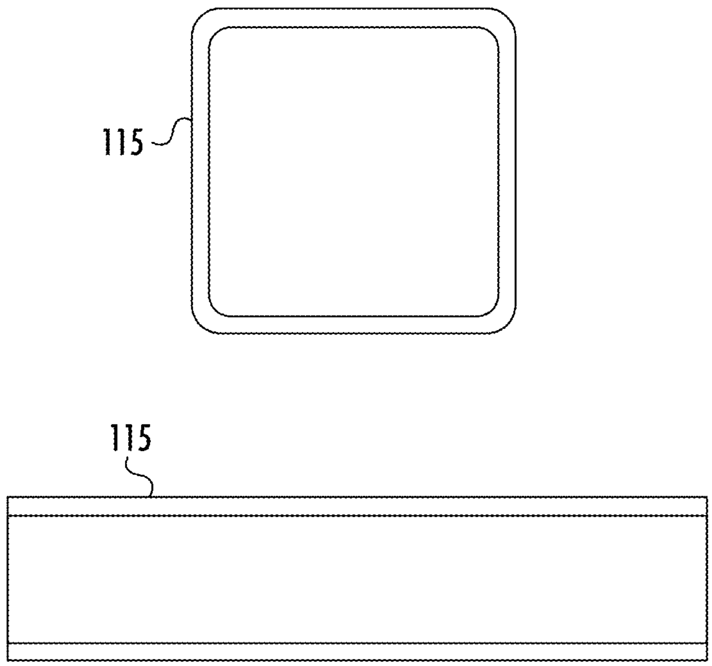

For example, with respect to side frame assemblies 110, FIG. 9 shows various views of upper side frame member 111. FIG. 10 shows various views of upper side frame member 112. FIG. 11 shows various views of lower side frame member 113. FIG. 12 shows various views of lower side frame member 114. FIG. 13 shows various views of vertical frame member 115. FIG. 14 shows various views of side connector member 118.

Figure 16:
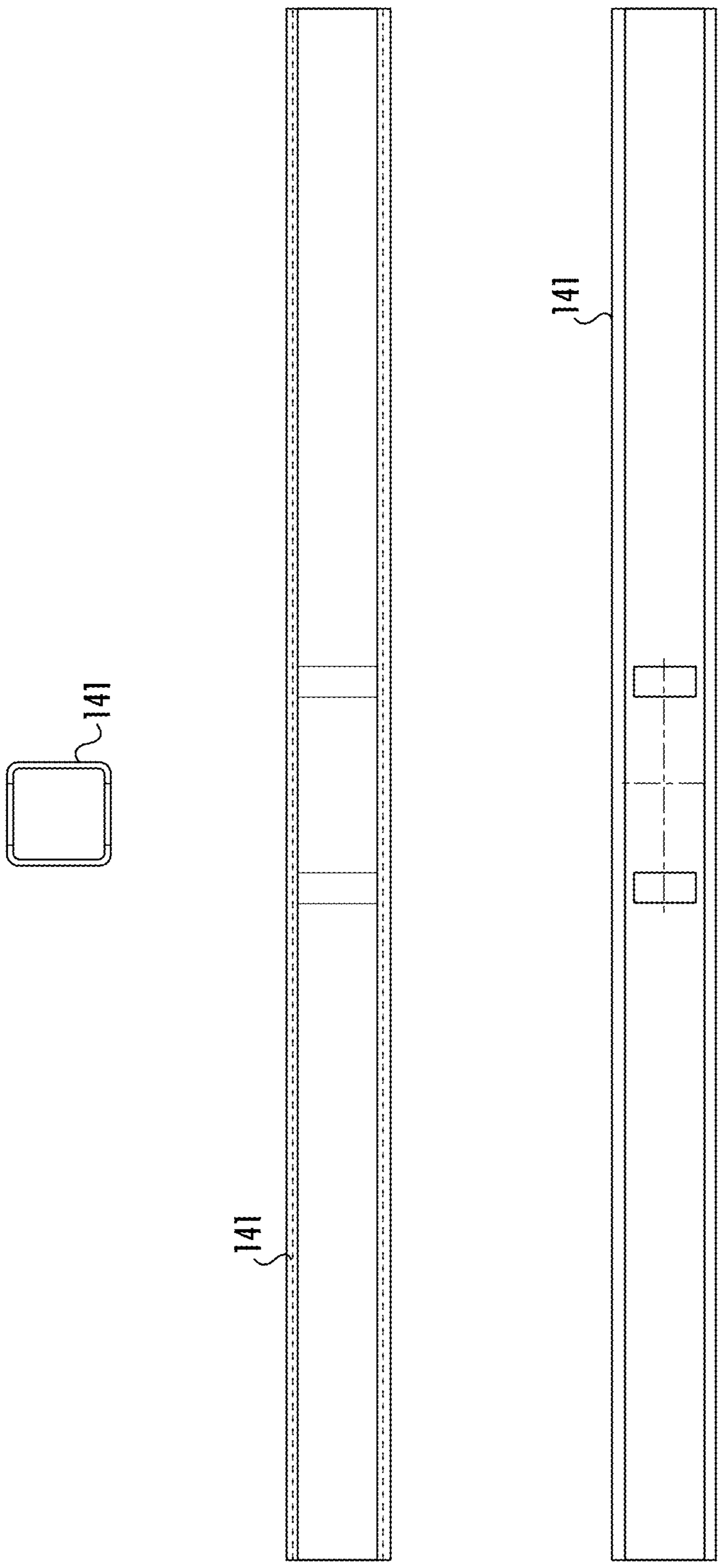
Figure 17:
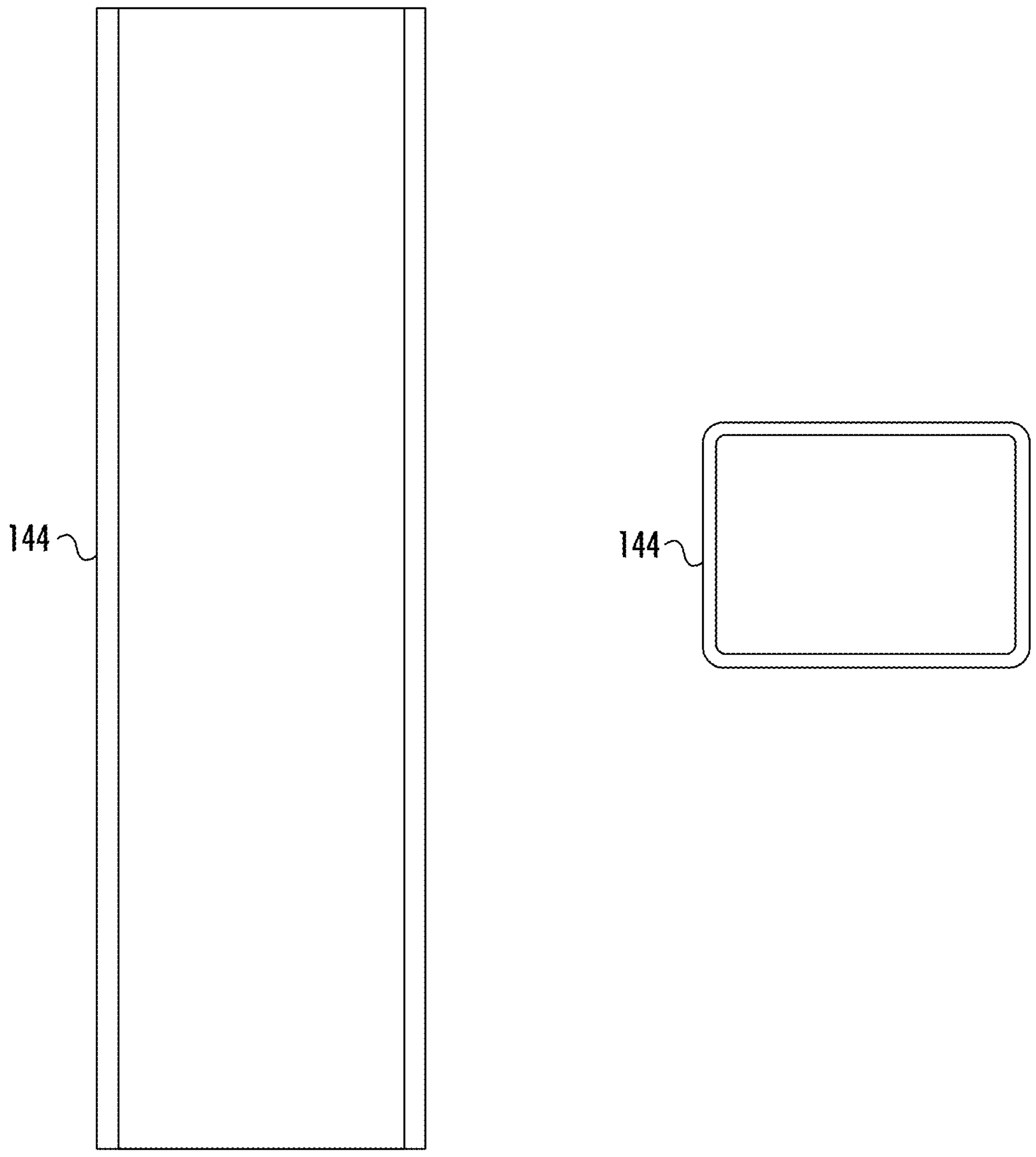
Figure 18:
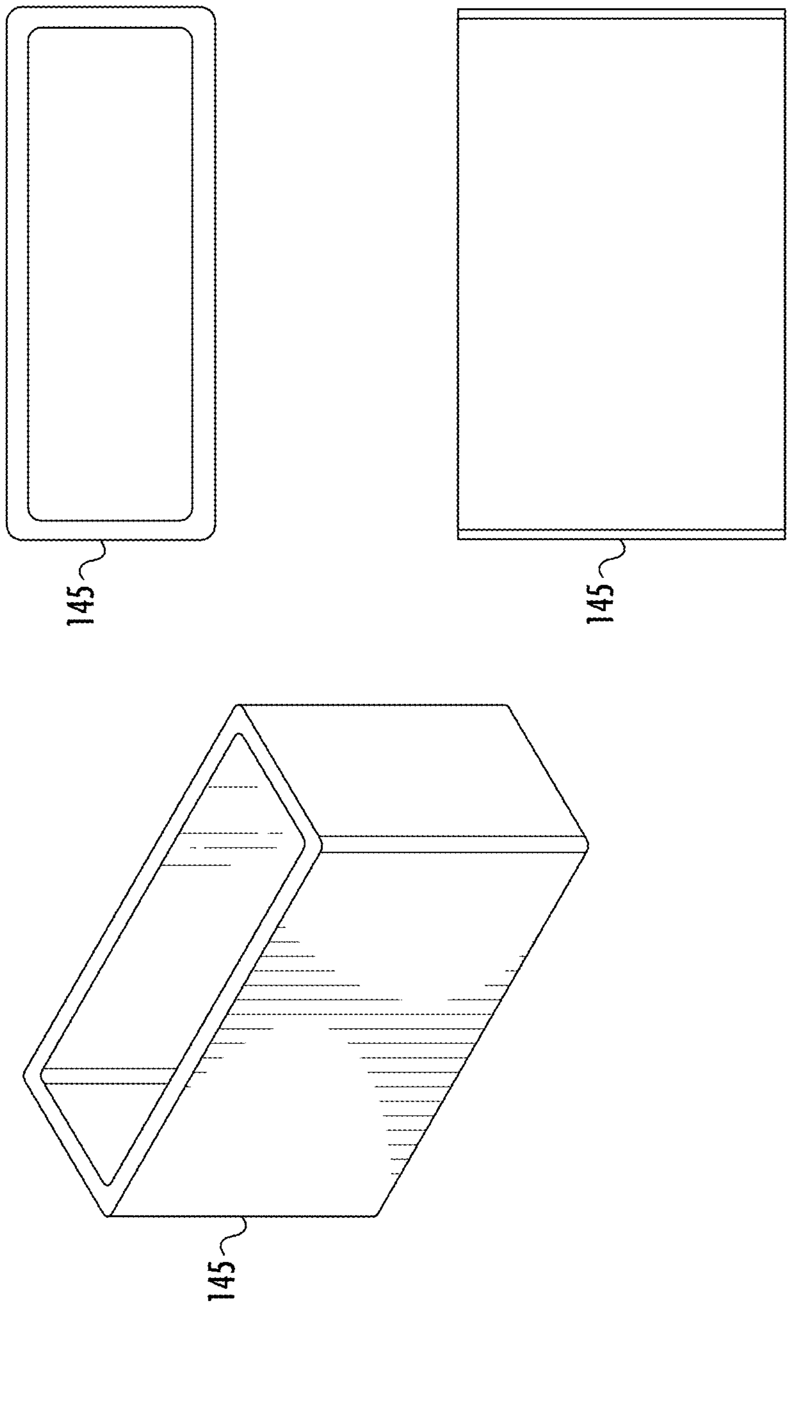
Figure 19:
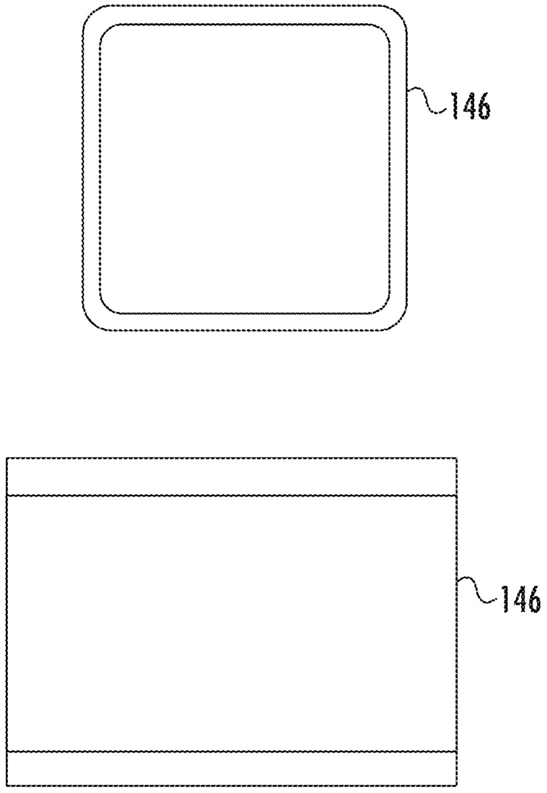
Figure 20:
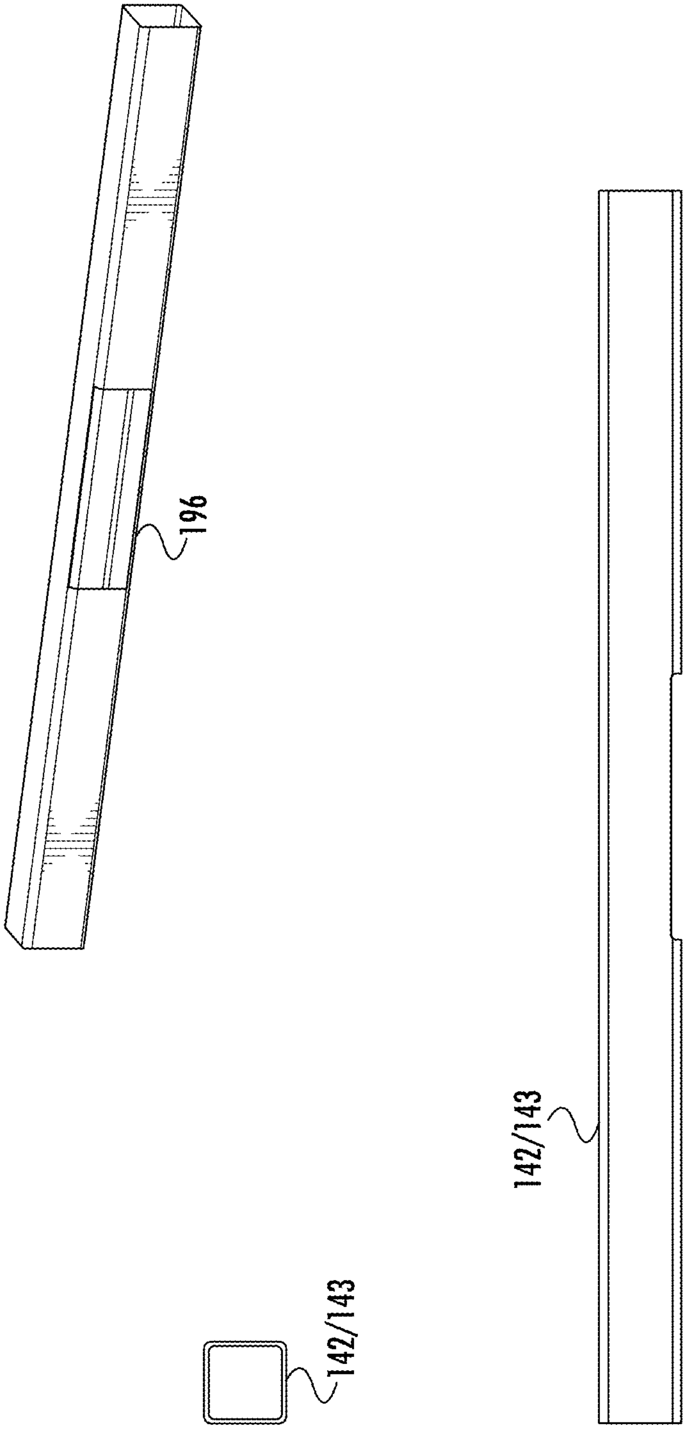

With respect to cross frame assembly 140, FIG. 15 shows a perspective view and a front view of cross frame assembly 140. FIG. 16 shows various views of upper bar member 141. FIG. 17 shows various views of a vertical bar member 144. FIG. 18 shows various views of slip tube socket 145. FIG. 19 shows various views of a socket side tube 146. FIG. 20 shows various views of lower bar members 142/143. Lower bar members 142/143 may each include a cutout 196. In one embodiment, respective cut outs 196 of each of lower bar members 142/143, when in an installed/assembled state, would oppose (face each other), and along with socket side tubes 146 provide a channel for slip tube socket 145 to be positioned.

Figure 21:
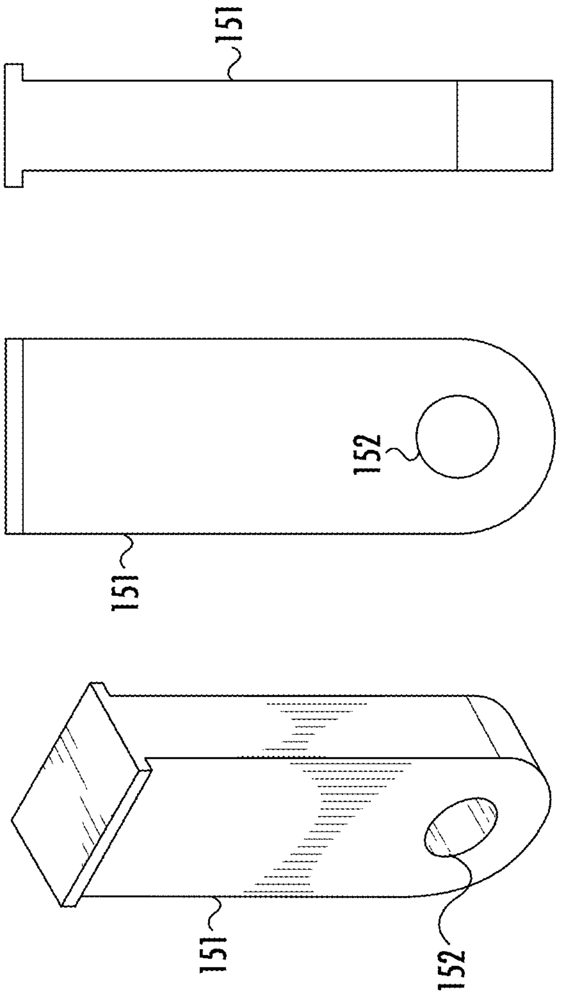

Referring still to trapeze assembly 108, FIG. 21 shows various views of hook assembly connecting pin 151. FIG. 22 shows various views of side frame connector 116. Side frame connector 116 may have a bushing end and a mounting portion 117 that may be fitted into the end of lower side frame member 113 (see FIG. 24). FIG. 23 shows various views of shackle 130. Shackle 130 may further include a shackle bushing slip tube 131 and shackle connectors 132.

Figure 24:
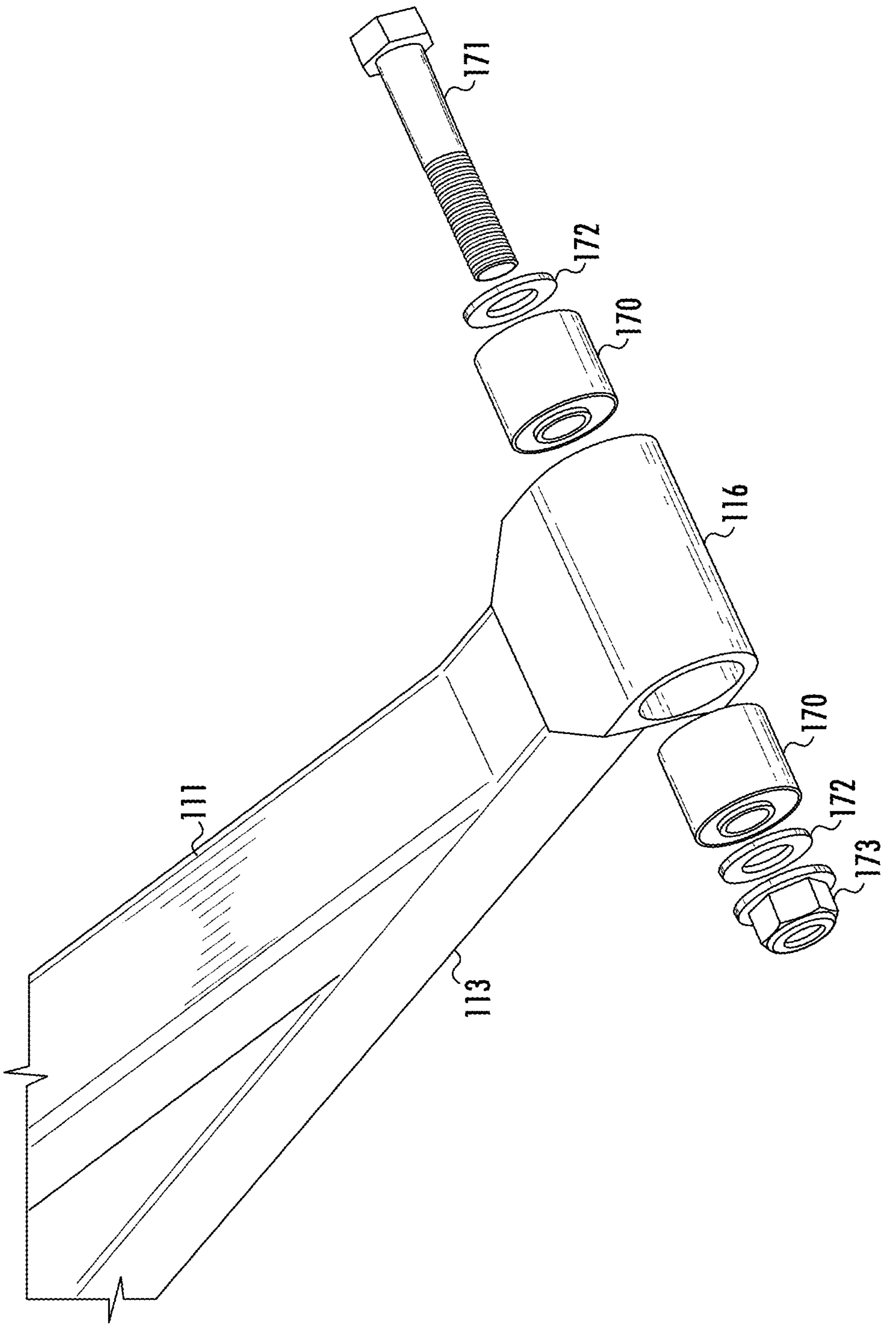
Figure 25:
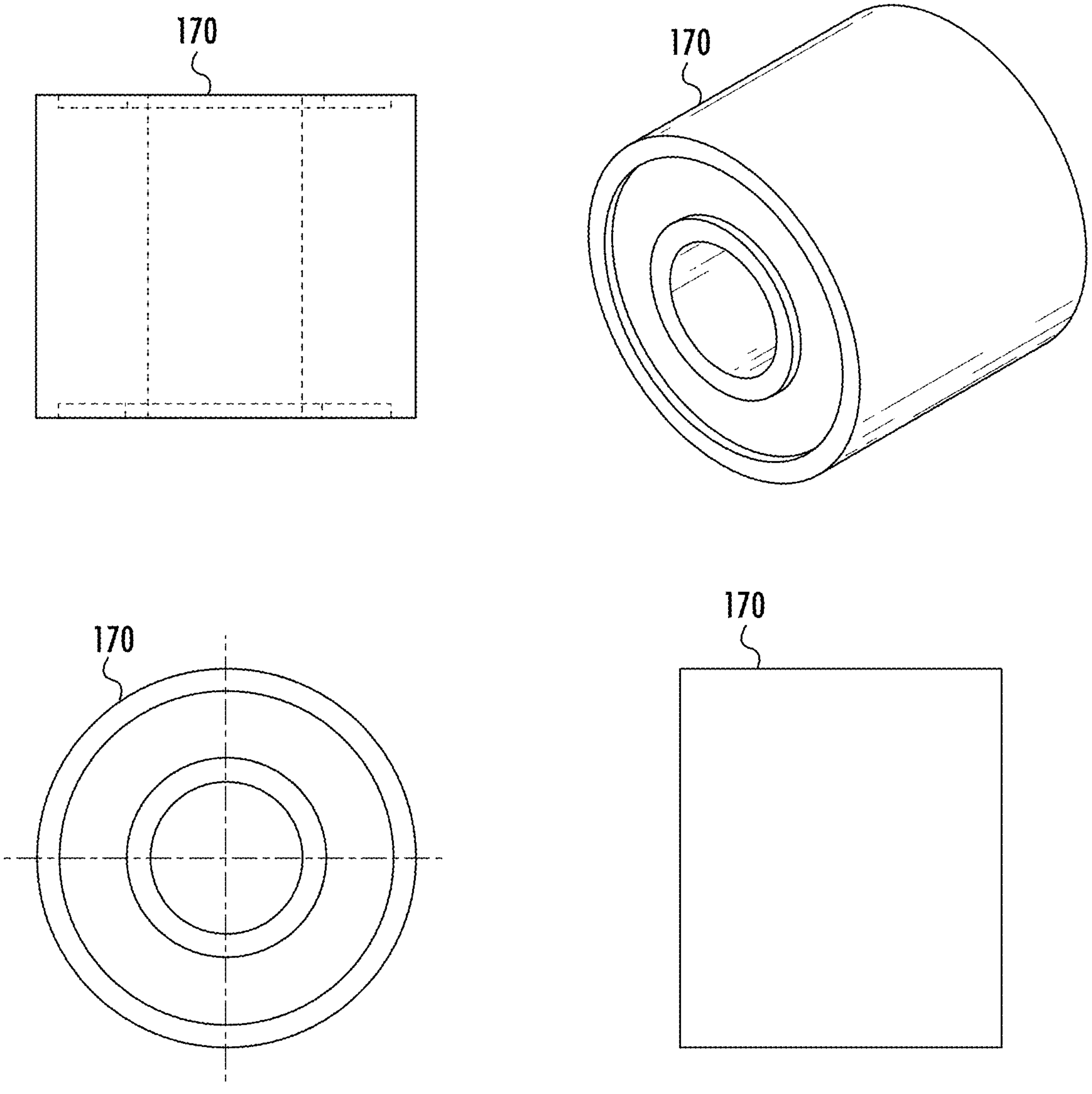

FIG. 24 shows an example exploded view of certain assembly components with respect to side frame connector 116. For example, assembly components of side frame connector 116 may include rubber isolator bushings 170 (see FIG. 25), a bolt 171, washers 172, and a nut 173, and in one example, may be arranged as shown in FIG. 24. FIG. 25 shows various views of an example of a rubber isolator bushing 170 that may be formed, for example, of neoprene or any other suitable material.

Figure 26:
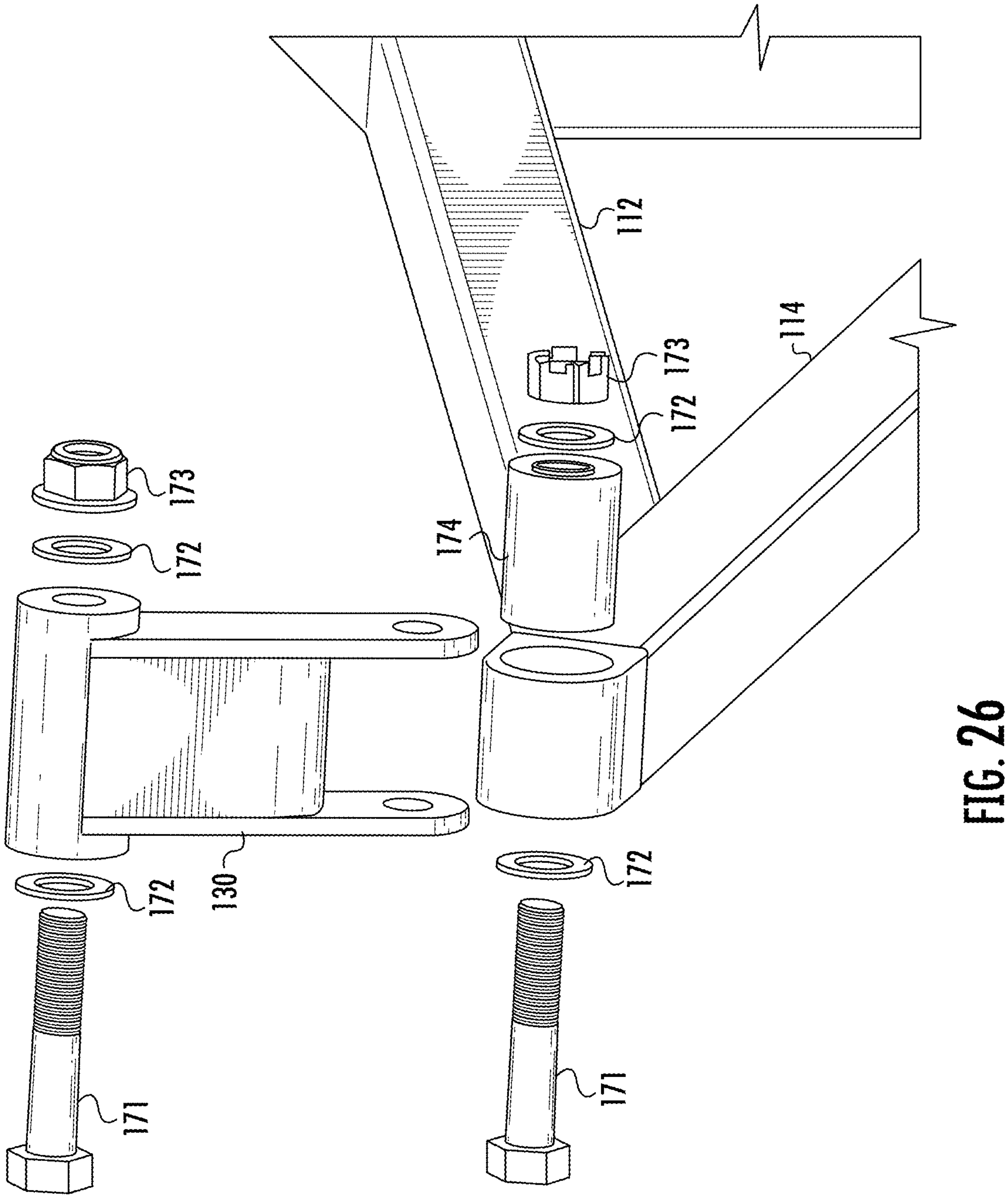
Figure 27:
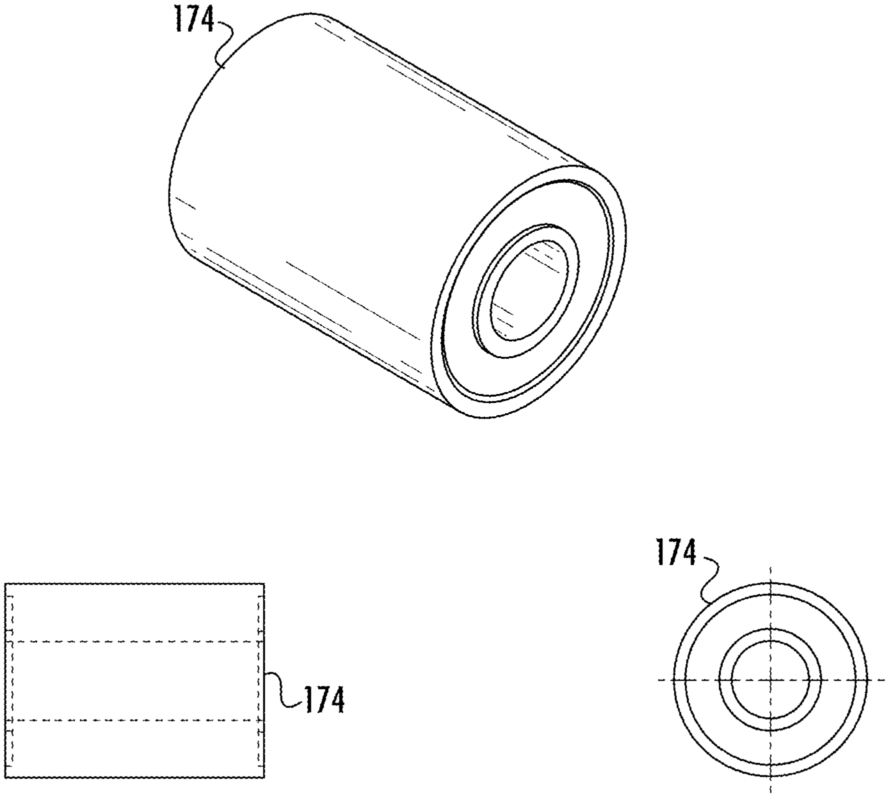
Figure 28:
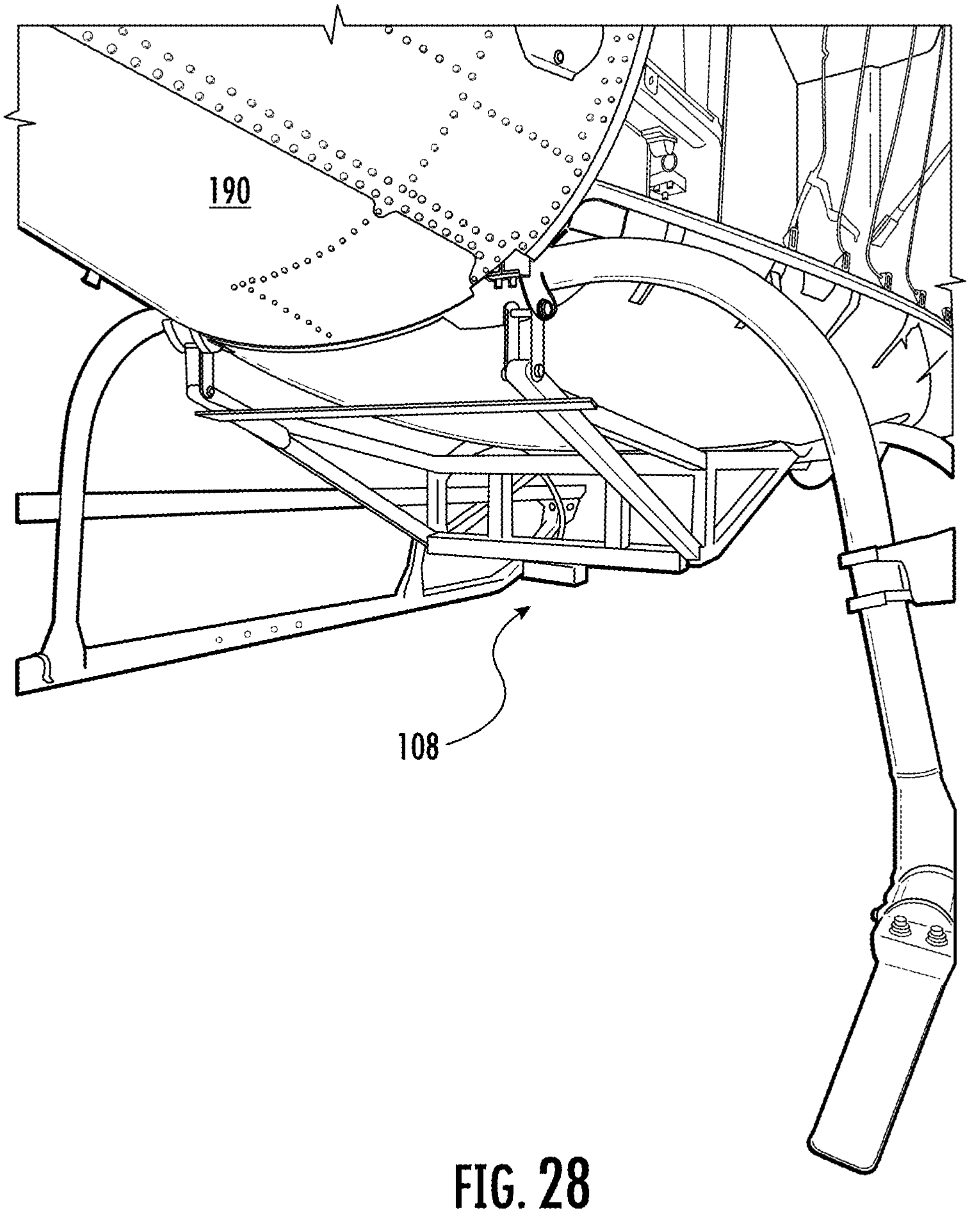
Figure 29:
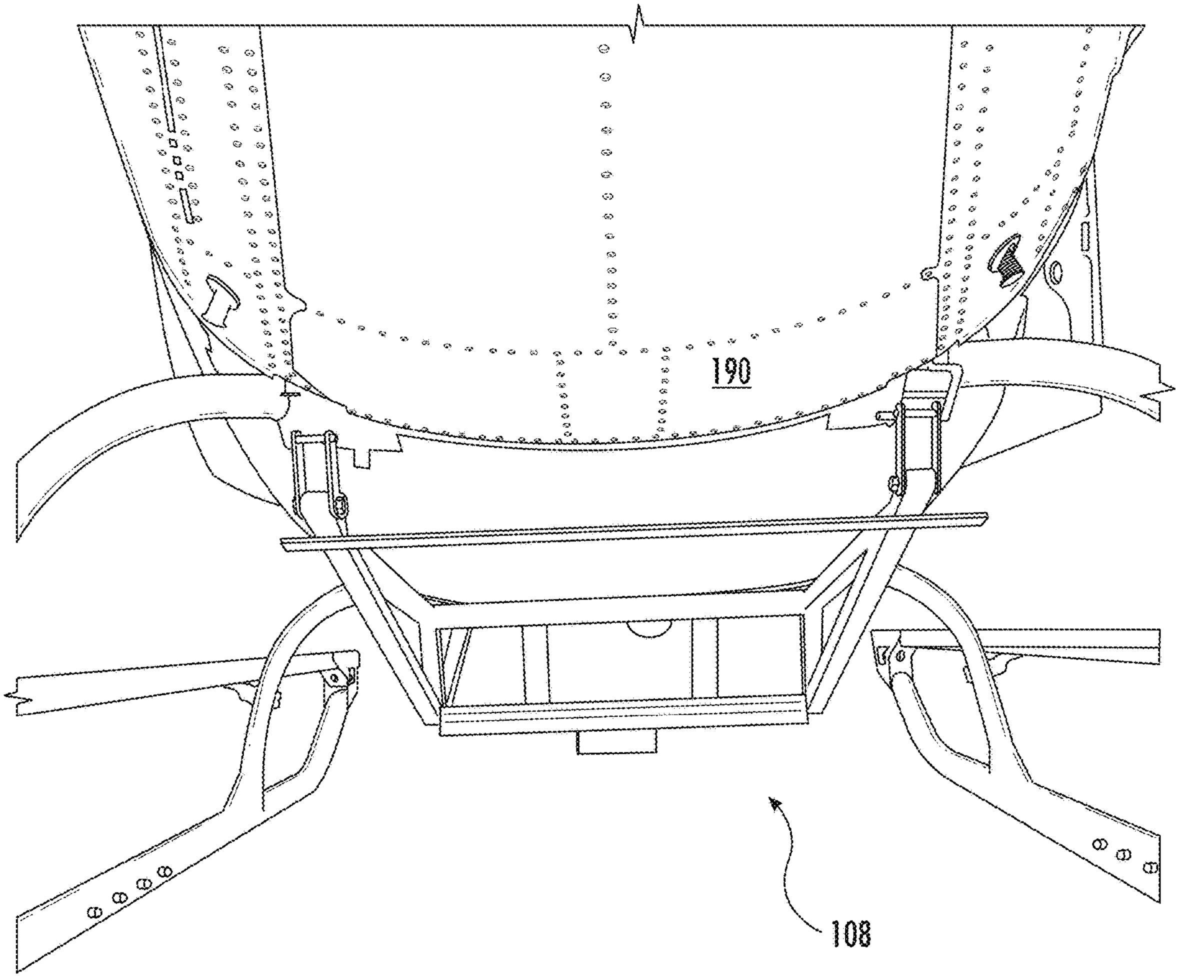
Figure 30:
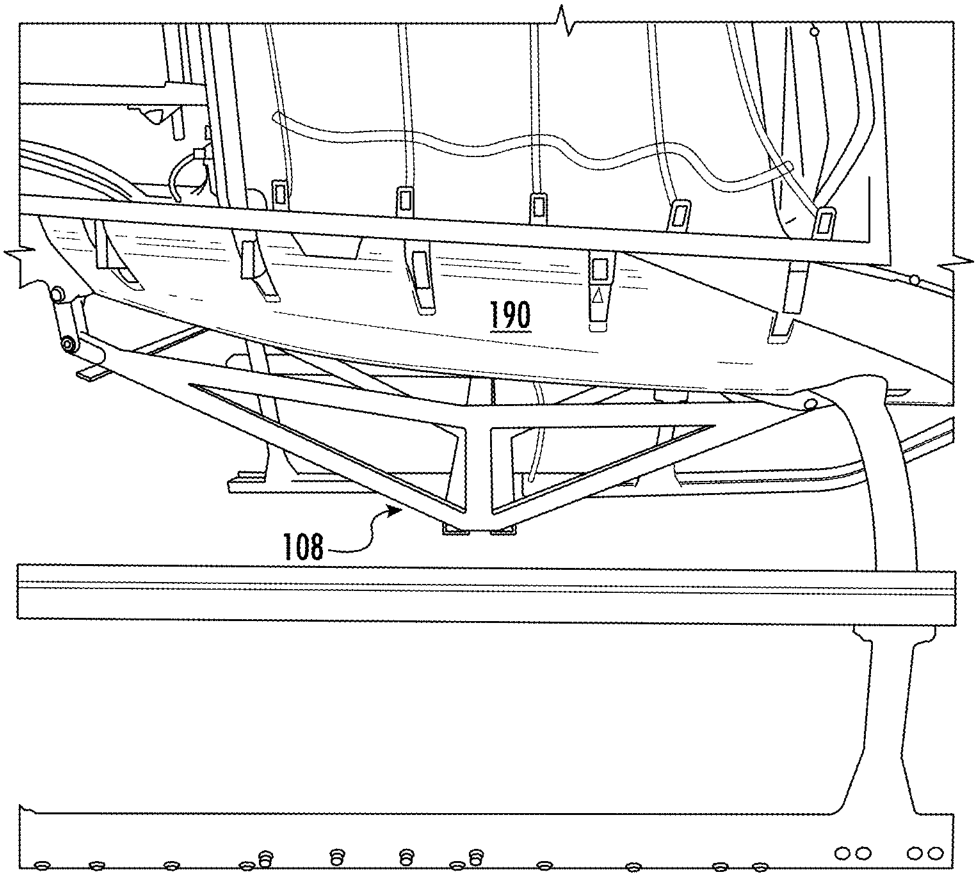
Figure 31:
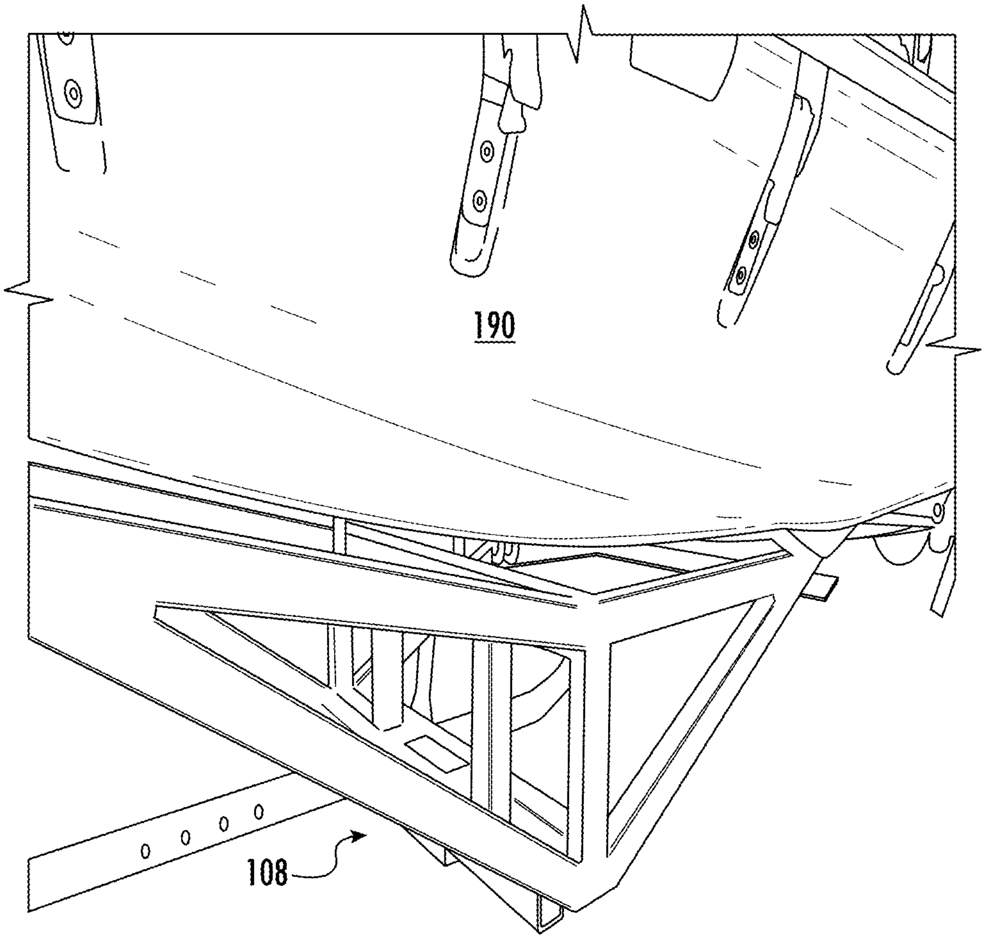

FIG. 26 shows an exploded view of certain assembly components with respect to shackle 130 at lower side frame member 114. For example, the assembly components may include a rubber isolator bushing 174 (see FIG. 27), bolts 171, washers 172, and nuts 173, and in one example, may be arranged as shown in FIG. 24. FIG. 27 shows various views of rubber isolator bushing 174 that may be formed, for example, of neoprene or any other suitable mechanism.

Referring now to FIG. 28 through FIG. 31 show photos of an example of a trapeze assembly 108 of the emergency load release mechanism 105 attached to the underside of a helicopter 190, in accordance with an embodiment of the invention.

Referring now to FIG. 32 through FIG. 39 is an example of a process of using the emergency load release mechanism 105 shown, for example, in FIG. 2, FIG. 3, FIG. 4, and FIG. 5, in accordance with an embodiment of the invention. By way of example, FIG. 32 through FIG. 39 show a hook assembly **150*a* and a hook assembly 150*b*. Each of the hook assemblies 150 may be formed via an arrangement of hook assembly plates 153 and release hook 155, and held to cross frame assembly 140 using a hook assembly connecting pin 151. Further, hook assembly plates 153 may include a plate stop portion 154. Plate stop portion 154 may be used as a guide for positioning load coupler 160 with respect to the hook assembly 150. Further, hook assembly plates 153 and release hook 155 of hook assemblies 150 may be formed of A513 steel or any other suitable material. In this example, hook assembly 150*a* may have a release hook 155*a* and hook assembly 150*b* may have a release hook 155*b***.

Figure 32:
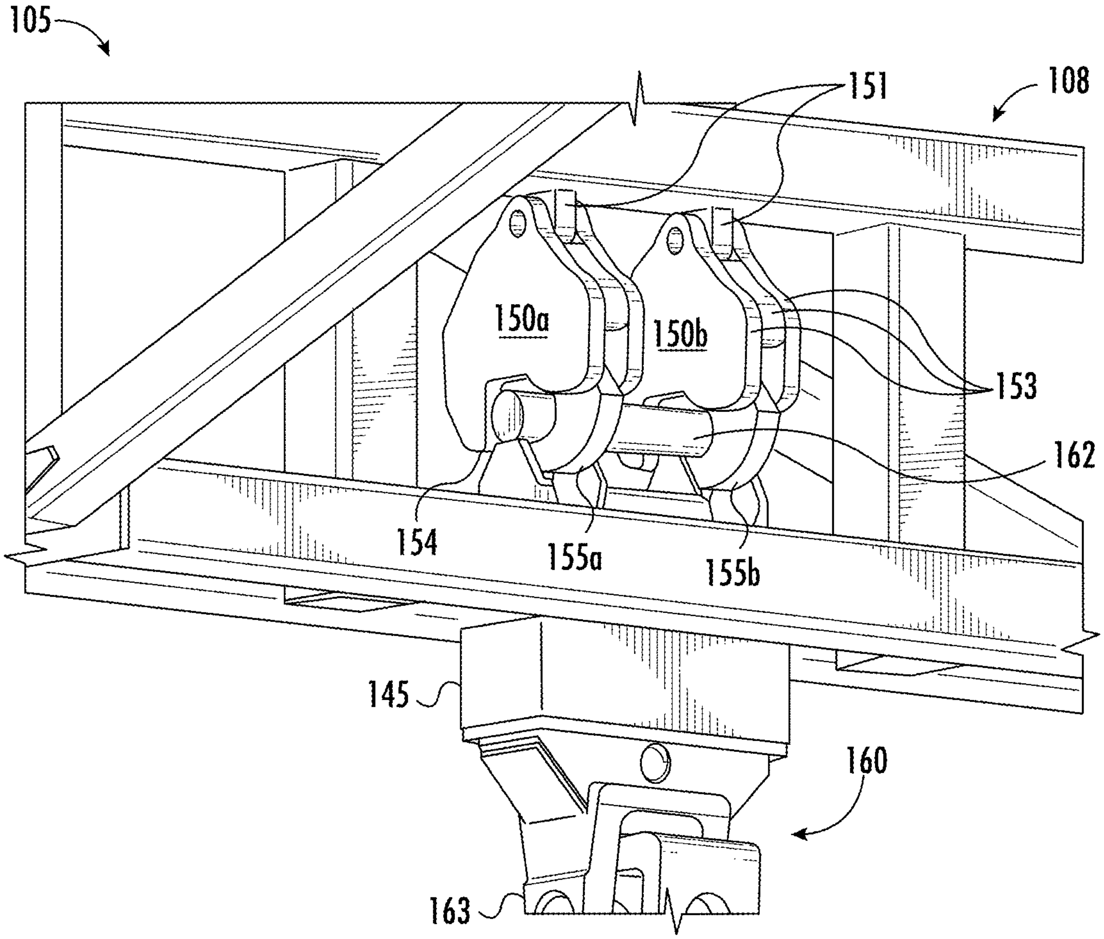
Figure 33:
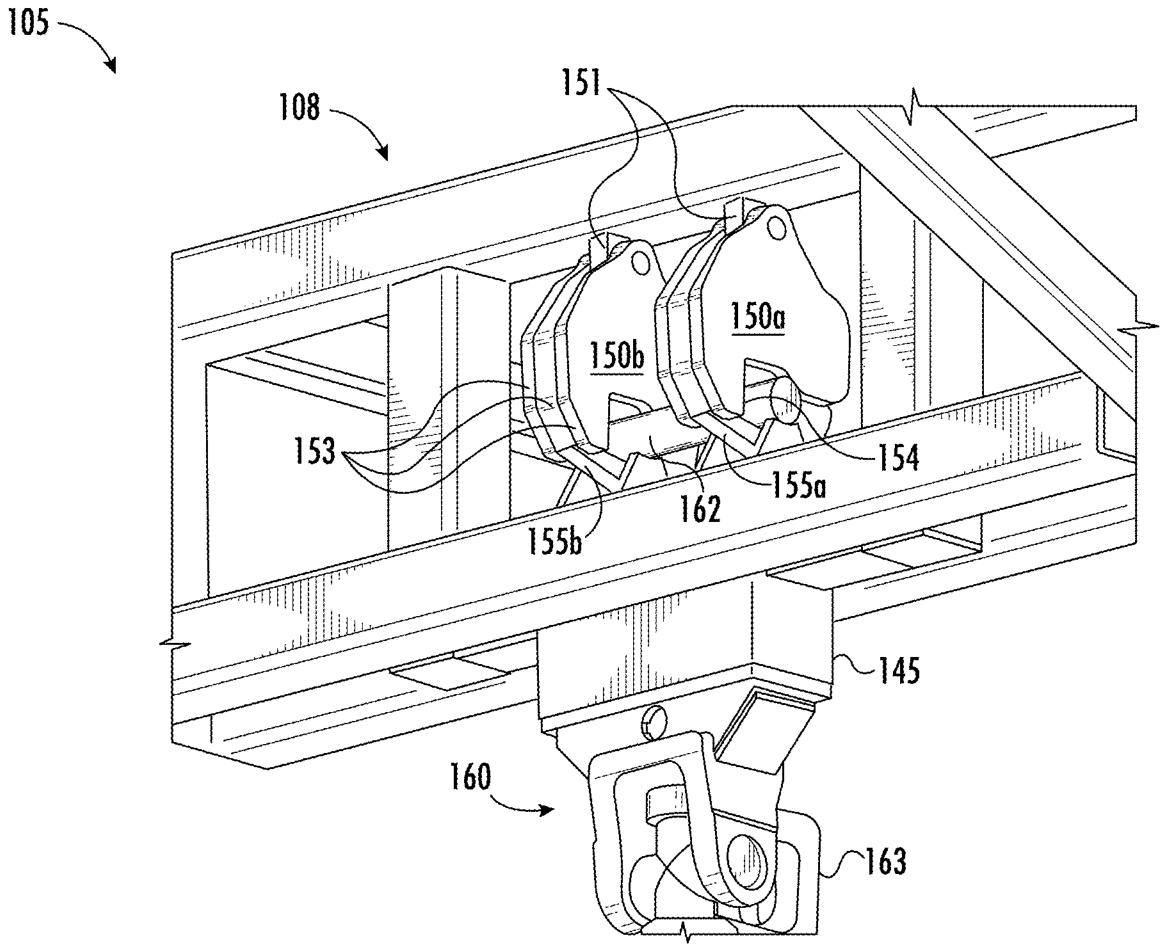

In a first step, FIG. 32 and FIG. 33 show both release hook **155*a* of hook assembly 150*a* and release hook 155*b* of hook assembly 150*b* engaged with and holding grab bar 162 of load coupler 160 that may be attached to a releasable load 195** (not shown).

Figure 34:
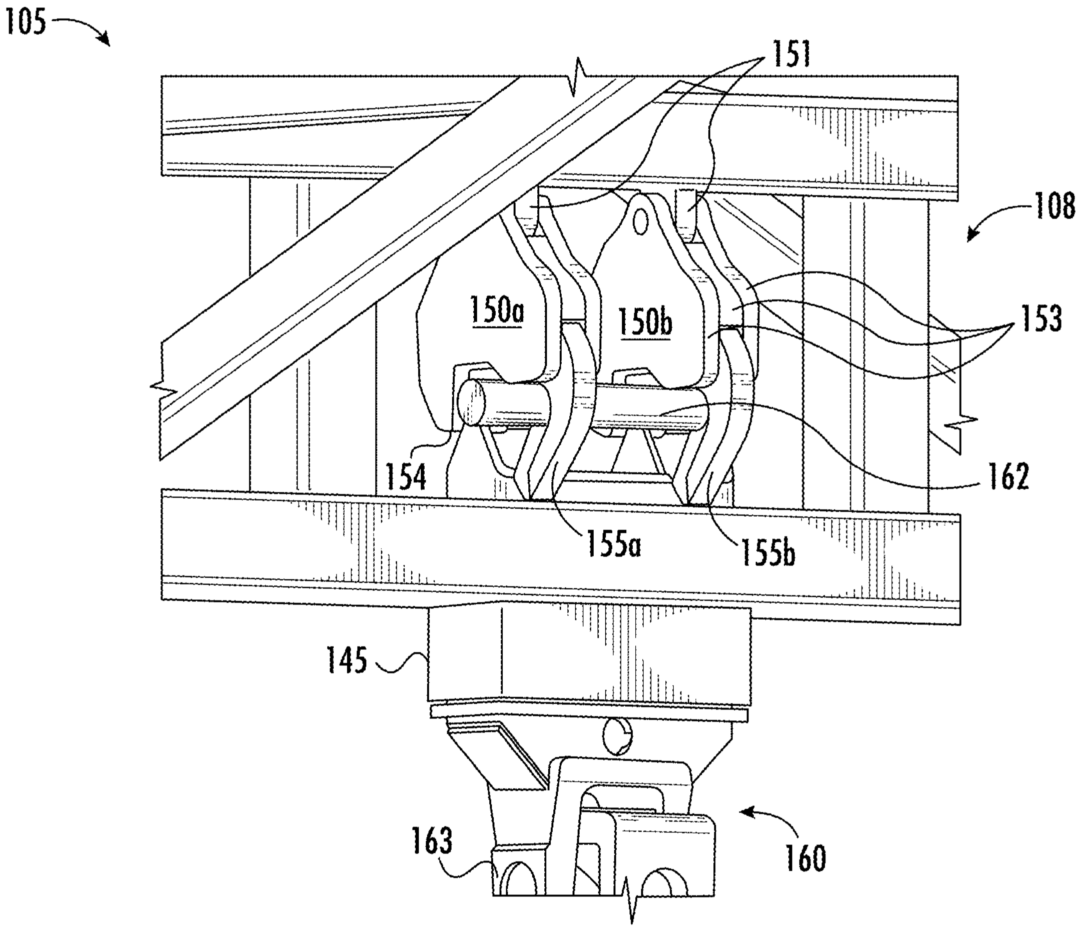
Figure 35:
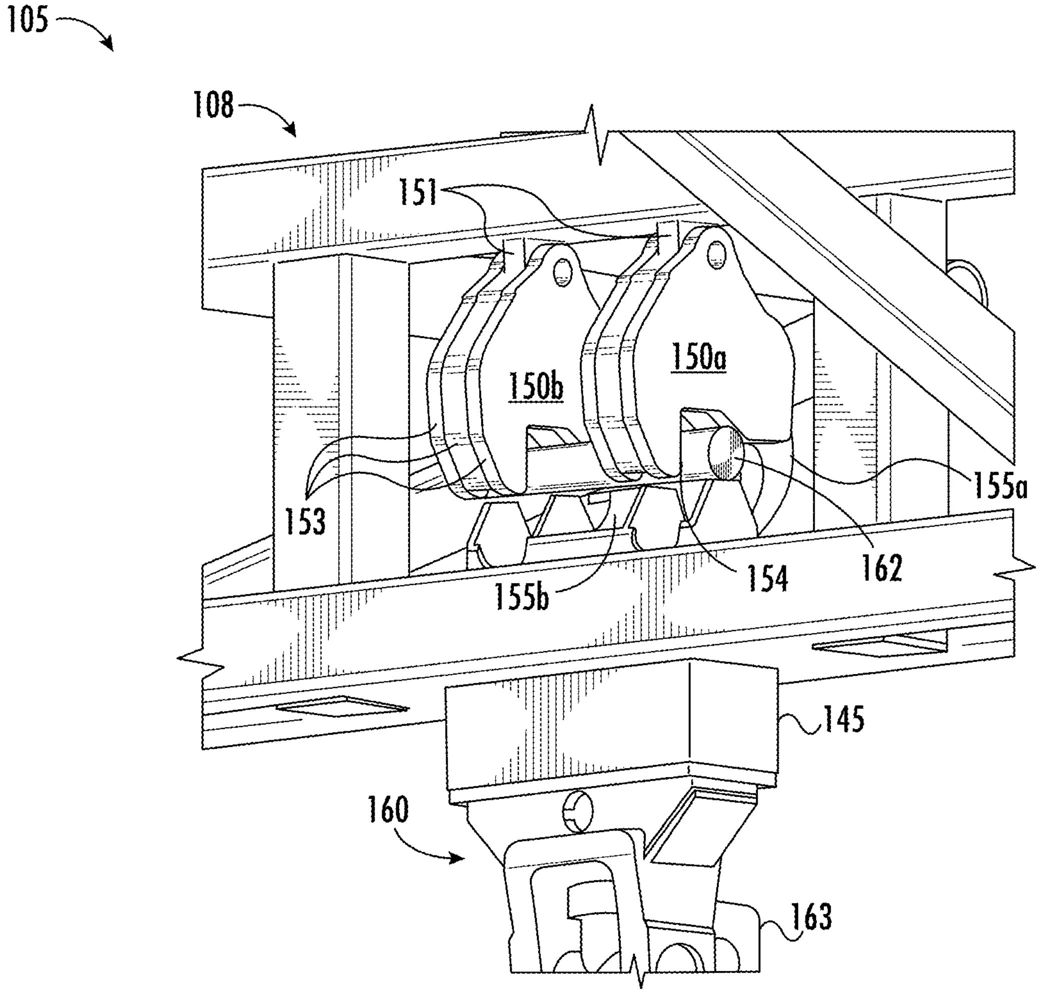
Figure 36:
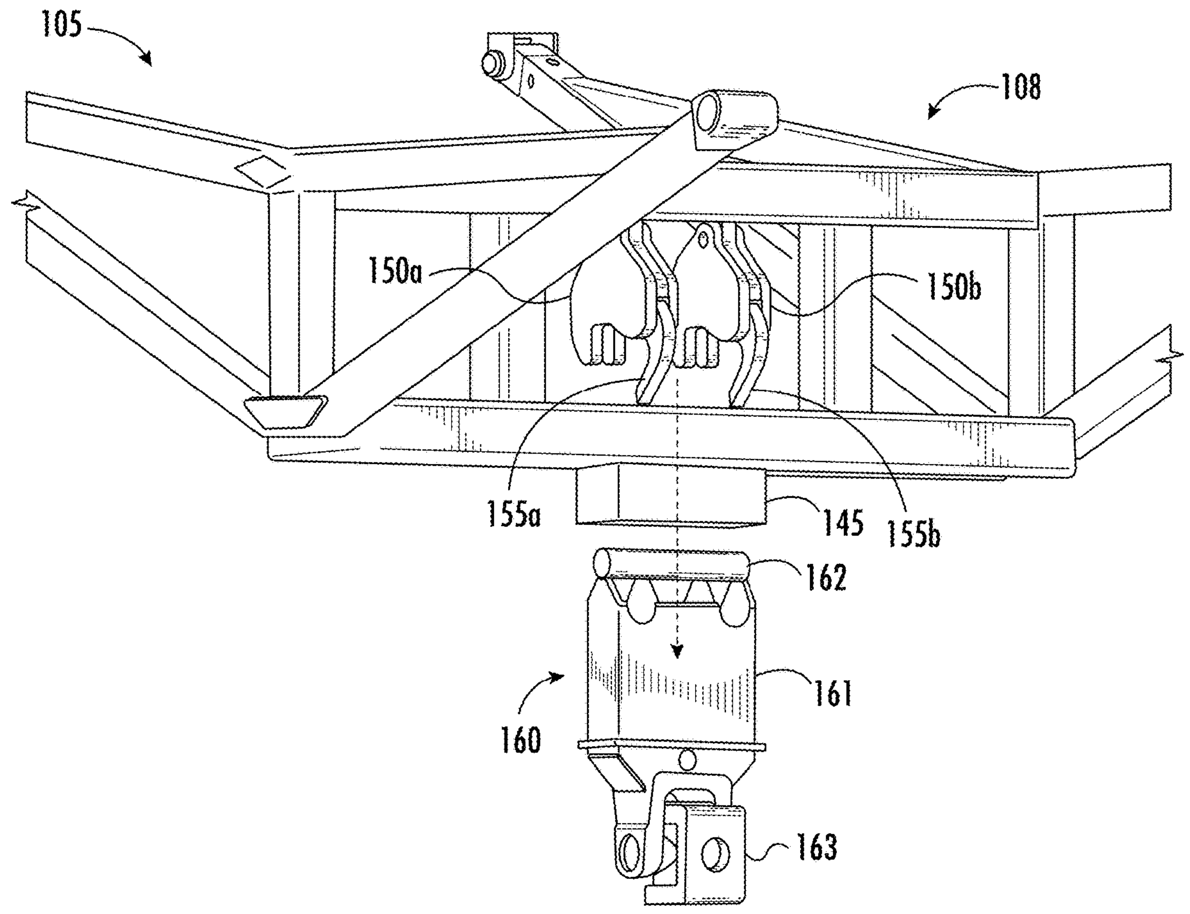
Figure 37:
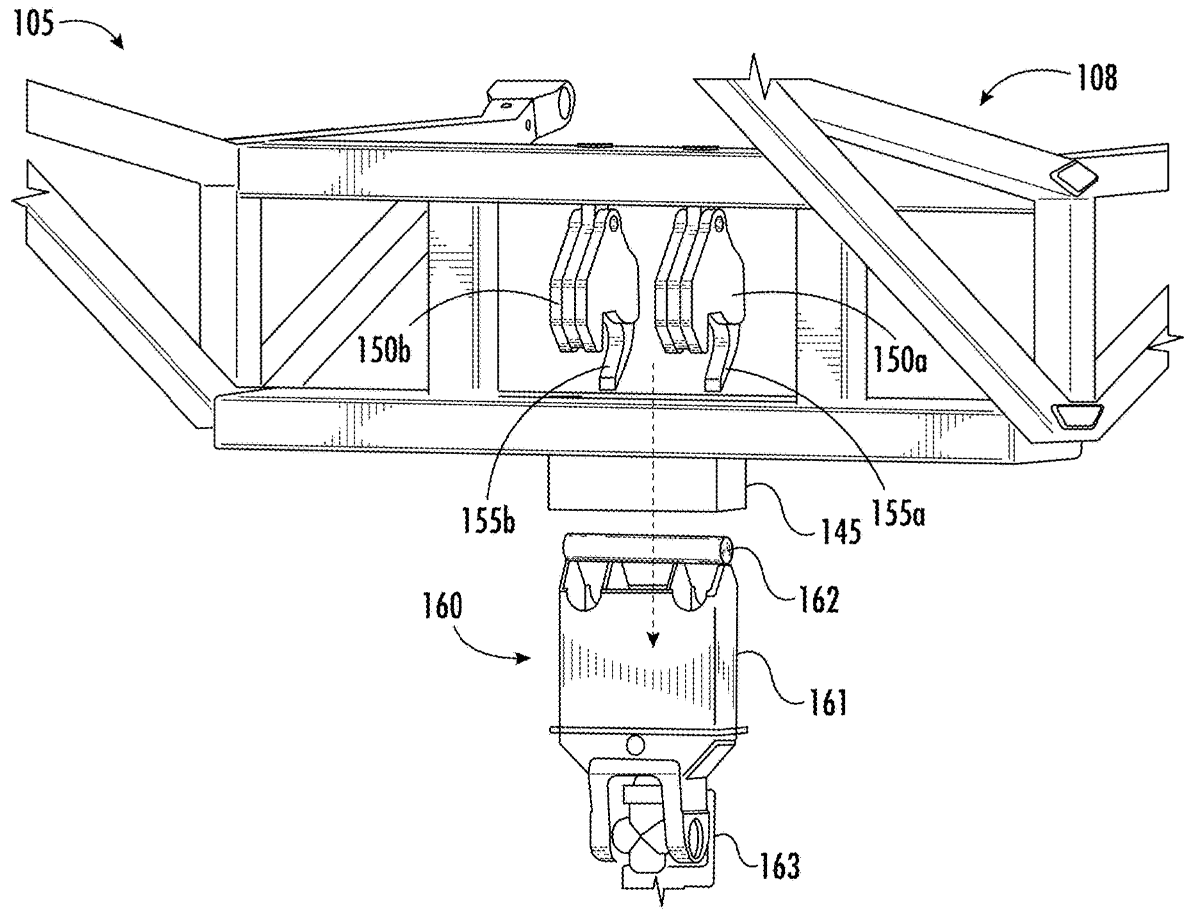

In a next step, FIG. 34 and FIG. 35 show both release hook **155*a* of hook assembly 150*a* and release hook 155*b* of hook assembly 150*b* released from holding grab bar 162 of load coupler 160. As a result of both release hook 155*a* and release hook 155*b* being released, FIG. 36 and FIG. 37 show load coupler 160 falling away from emergency load release mechanism 105. That is, load coupler 160 slides out of slip tube socket 145 of trapeze assembly 108 and falls away from emergency load release mechanism 105**.

Figure 38:
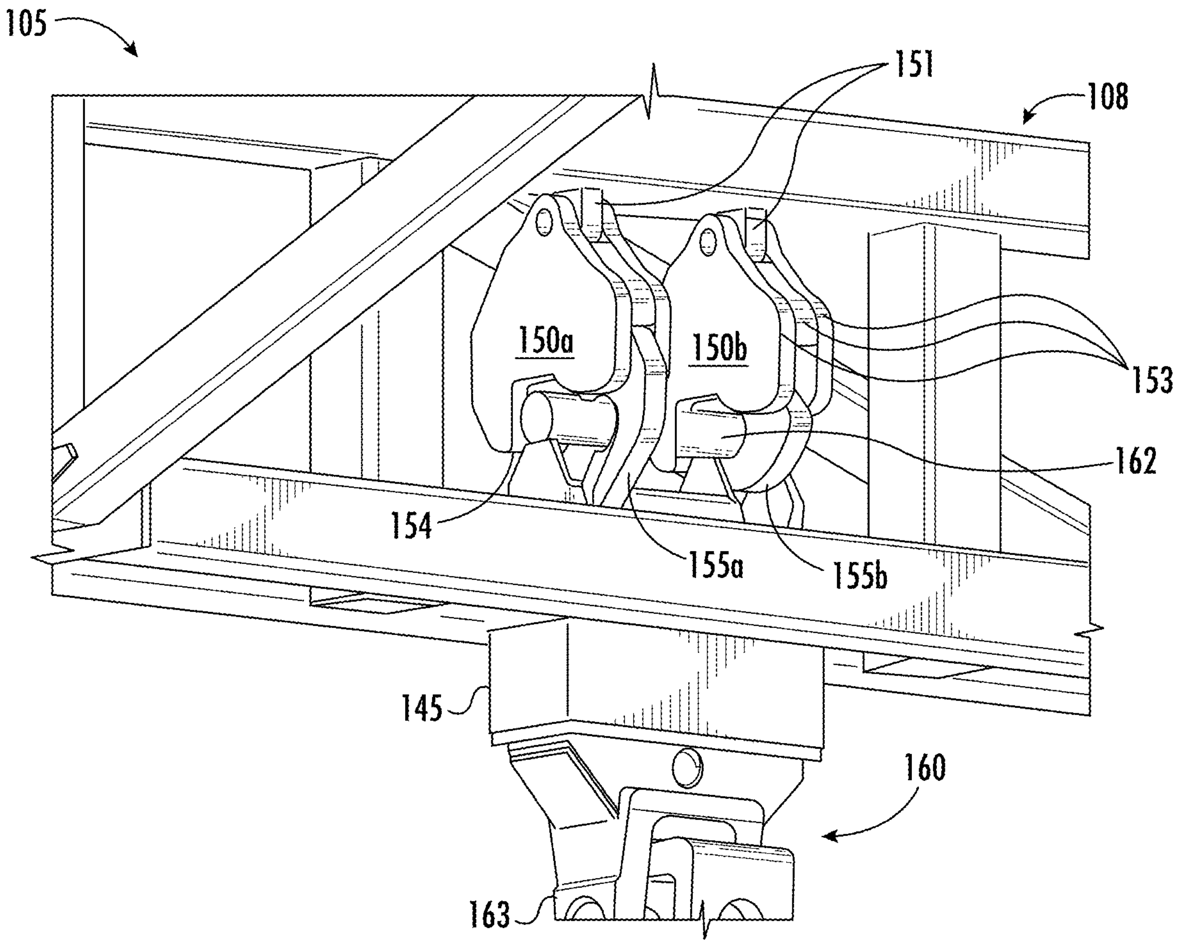
Figure 39:
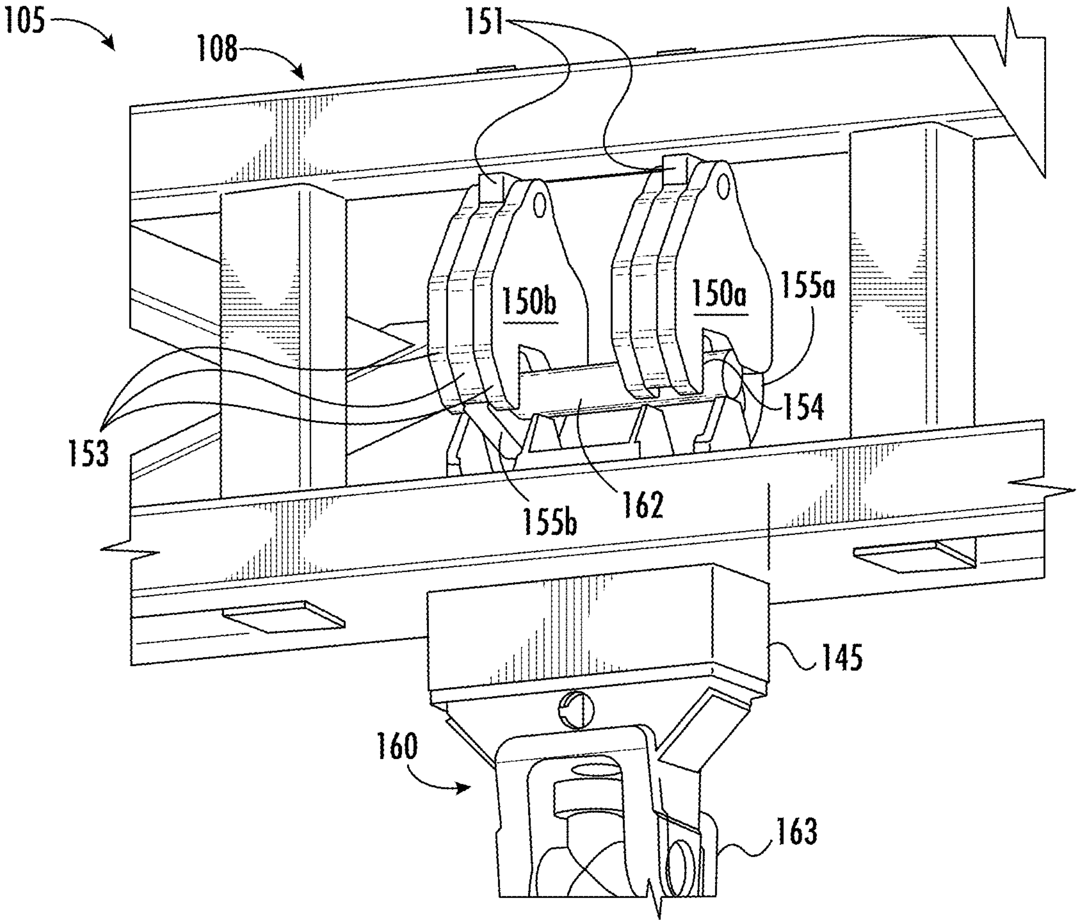

Alternatively, release hooks 155 may be release individually, one at a time, for example, FIG. 38 and FIG. 39 shows release hook **155*a* of hook assembly 150*a* released from load coupler 160 and release hook 155*b* of hook assembly 150*b* still engaged with and holding grab bar 162 of load coupler 160. That is, FIG. 38 and FIG. 39 show one hook assembly 150 released and one hook assembly 150 still holding load coupler 160**.

Referring now to FIG. 41 is perspective views of an example of a cyclic 197 of a helicopter 190 including trigger mechanism 182, in accordance with an example embodiment of the invention. Trigger mechanism 182 may include, for example, one or more control buttons 183, and may also include one or more levers 184. In one example embodiment, trigger mechanism 182 may include a single control button 183 and may also include a single lever 184, wherein the single control button 183 may electrically actuate both hook assemblies 150 simultaneously to open, and the single lever may mechanically actuate both hook assemblies 150 simultaneously to open. In another example embodiment, trigger mechanism 182 may include two control buttons 183, and may also include two levers 184, wherein each of the control buttons 183 may independently electrically actuate a single one of the hook assemblies 150 to open (i.e., one for each hook assembly 150), and each of the levers 184 may independently mechanically actuate a single one of the hook assemblies 150 to open (i.e., one for each hook assembly 150). In yet another example embodiment, the one or more control buttons may be on the trigger mechanism 182 of the cyclic 197, and the one or more levers 184 may be included on a collective 198 of the helicopter 190 (see FIG. 41). Cables 185 may be used to electrically and/or mechanically connect the one or more control buttons 183 and/or the one or more levers 184 to their respective hook assemblies 150.

In one example embodiment, a single control button 183 may provide an electrically activated simultaneous release (electrical release) of the two hook assemblies 150, and a single lever 184 may provide a mechanically actuated simultaneous release (mechanical release) of the two hook assemblies 150. In another example embodiment, the two control buttons 183 may provide an electrically activated release (electrical release) of each of the two hook assemblies 150, and the two levers 184 may provide a mechanically actuated release (mechanical release) of each of the two hook assemblies 150.

Referring now to FIG. 42 is a flow diagram of an example of a method 300 of using aerial transport system 100 including emergency load release mechanism 105 further including a dual-hook arrangement for minimizing an inadvertent load release due to, for example, a mechanical failure, in accordance with an embodiment of the invention. Method 300 may include, but is not limited to, the following steps.

At a step 310, an aerial transport system including an emergency load release mechanism further including dual-hook arrangement is provided. For example, aerial transport system 100 shown in FIG. 1 may be provided. Aerial transport system 100 may include emergency load release mechanism 105 further including two hook assemblies 150; all as described above in FIG. 1 through FIG. 41. Method 300 may proceed to step 315.

At a step 315, the load is coupled to the dual-hook arrangement of emergency load release mechanism. For example, releasable load 195 (e.g., aerial saw 200) may be coupled to load release mechanism 105 using load coupler 160. For example, FIG. 32 and FIG. 33 show both release hook **155*a* of hook assembly 150*a* and release hook 155*b* of hook assembly 150*b* engaged with and holding grab bar 162 of load coupler 160 that may be attached to a releasable load 195. Method 300 proceeds to step 320**.

At a step 320, the aircraft becomes/remains airborne with load coupled to and suspended from the emergency load release mechanism. For example, FIG. 1 shows helicopter 190 airborne with releasable load 195 (e.g., aerial saw 200) coupled to and suspended from load release mechanism 105. Method 300 may proceed to step 325.

At a decision step 325, it is determined whether an emergency release condition is present. For example, the pilot and/or co-pilot of helicopter 190 determines whether a condition exists that warrants or otherwise justifies an emergency release of releasable load 195 (e.g., aerial saw 200). If an emergency release condition is present, then method 300 may proceed to step 330. However, if an emergency release condition is not present, then method 300 may return to step 320.

At a step 330, the hooks of the emergency load release mechanism are released. For example, FIG. 34 and FIG. 35 show both release hook 155*a* of hook assembly 150*a* and release hook 155*b* of hook assembly 150*b* released from holding grab bar 162 of load coupler 160. This step may be performed by the pilot and/or co-pilot using the one or more control buttons 183 and/or the one or more levers 184. Method 300 ends.

The dimensions referenced herein and in the drawings are meant as exemplary only, and the actual dimensions may be smaller or larger as needed.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

The terms "comprise," "comprises," "comprising," "include," "includes," and "including," are intended to be non-limiting, such that recitation of items in a list is not to the exclusion of other like items that may be substituted or added to the listed items.

Terms like "preferably," "commonly," and "typically" are not utilized herein to limit the scope of the claimed embodiments or to imply that certain features are critical or essential to the structure or function of the claimed embodiments. These terms are intended to highlight alternative or additional features that may or may not be utilized in a particular embodiment of the present invention.

The term "substantially" is utilized herein to represent the inherent degree of uncertainty that may be attributed to any quantitative comparison, value, measurement, or other representation and to represent the degree by which a quantitative representation may vary from a stated reference without resulting in a change in the basic function of the subject matter of the invention at issue.

Various modifications and variations of the disclosed methods, compositions and uses of the invention will be apparent to the skilled person without departing from the scope and spirit of the invention. Although the subject matter of the invention has been disclosed in connection with specific preferred aspects or embodiments, it should be understood that the subject matter of the invention as claimed should not be unduly limited to such specific aspects or embodiments.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the specification, drawings, and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter of the invention has been described in some detail by way of illustration and example for purposes of clarity of understanding, it will be understood by those skilled in the art that certain changes and modifications can be practiced within the scope of the appended claims.

That which is claimed:

1. An aerial emergency load release mechanism system, comprising:

a. a frame assembly, comprising:
   i. a pair of side frame assemblies; and
   ii. a cross frame assembly extending between the pair of side frame assemblies;

b. first and second quick-release hook assemblies connected to the cross frame assembly, wherein the first and second quick-release hook assemblies are individually controllable between a release and closed position; and c. a load coupler having an upper end releasably attachable to the first and second quick-release hook assemblies, and a lower end with a releasable load attachment point.

2. The system of claim 1, wherein the aerial emergency load release mechanism system is configured to couple to and suspend therefrom a releasable load via the load coupler, and wherein the aerial emergency load release mechanism system is configure to provide a quick-release of the releasable load.

3. The system of claim 1, wherein each of the first and second quick-release hook assemblies comprising a quick-release hook, and wherein the releasable load is not released unless both of the quick-release hooks of the first and second quick-release hook assemblies are released.

4. The system of claim 1, wherein the aerial emergency load release mechanism system is configured to couple to an underside of an aircraft.

5. The system of claim 1, wherein the releasable load comprises an aerial saw.

6. The system of claim 1, wherein each of the pair of side frame assemblies comprise:

a. a first upper side frame member;

b. a second upper side frame member, wherein the second upper side frame member is connected at a first end thereof in an end to end fashion with a first end of the first upper side frame member, the connected first upper side frame member and second upper side frame member forming a somewhat flattened V shape;

c. a first lower side frame member;

d. a second lower side frame member, wherein the second lower side frame member is connected at a first end thereof in an end to end fashion to a first end of the first lower side frame member via a side connector member the connected first lower side frame member and second lower side frame member forming a generally V shape;

e. a vertical frame member extending from an intersection of the first upper side frame member and the second upper side frame member down to the side connector member;

f. a side frame connector disposed at a second end of the first lower side frame member;

g. a shackle disposed at a second end of the second lower side frame member; and wherein the side frame connector and the shackle are configured for attachment to a chassis of an aircraft, and wherein a second end of the first upper side frame member is connected to an area of the second end of the first lower side frame member proximate to the side frame connector and a second end of the second upper side frame member is connected to an area of the second end of the second lower side frame member proximate to the shackle.

7. The system of claim 1, wherein the cross frame assembly comprises:

a. an upper horizontal bar member;

b. a first lower horizontal bar member and a second lower horizontal bar member, wherein the first lower horizontal bar member and the second lower horizontal bar member are arranged in parallel and in the same horizontal plane with one another, the first lower horizontal bar member and the second lower horizontal bar member vertically spaced apart from and parallel with the upper horizontal bar member;

c. first and second vertical bar members spaced apart and parallel with one another, and arranged vertically between the upper horizontal bar member and the first and second lower horizontal bar members, wherein the first and second lower horizontal bar members are configured such that the first lower horizontal bar member is disposed on a first side of an end portion of the first and second vertical bar members and the second lower horizontal bar member is disposed on a second opposing side of the end portion of the first and second vertical bar members thereby forming a gap between the first and second lower horizontal bar members; and d. a slip tube socket formed by the gap formed between the first and second horizontal lower bar members.

8. The system of claim 1, wherein the load coupler, comprises:

a. a coupler housing, wherein the coupler housing is configured to slideable fit within a slip tube socket of the cross frame assembly;

b. a grab bar disposed at an upper portion of the coupler housing, wherein the grab bar is configure to be fitted into and held by the first and second quick-release hook assemblies;

c. a swivel connector disposed at a lower portion of the coupler housing, wherein the swivel connector is configured to couple to the releasable load; and wherein when released quick-release hooks of the first and second quick-release hook assemblies release the grab bar and the load coupler slides through the slip tube socket with the releasable load coupled thereto, thereby jettisoning the releasable load from the aircraft.

9. The system of claim 4, wherein the aircraft comprises a helicopter.

10. The system of claim 4, wherein the first quick-release hook assembly and the second quick-release hook assembly are each individually actuated from a closed to release position or from a release to closed position by one or more actuators located within the aircraft.

11. The system of claim 10, wherein the one or more actuators comprise any of one or more buttons, levers, switches, toggles, and/or triggers.

* * * * *